(12) United States Patent
Kozawa et al.

(10) Patent No.: US 11,597,817 B2
(45) Date of Patent: Mar. 7, 2023

(54) THERMOPLASTIC RESIN COMPOSITION, METHOD OF PRODUCING THERMOPLASTIC RESIN COMPOSITION, MOLDED ARTICLE OF CELLULOSE-REINFORCED RESIN, AND METHOD OF PRODUCING MOLDED ARTICLE OF CELLULOSE-REINFORCED RESIN

(71) Applicant: FURUKAWA ELECTRIC CO., LTD., Tokyo (JP)

(72) Inventors: Eiji Kozawa, Tokyo (JP); Takeshi Yagi, Tokyo (JP); Yasuo Nakajima, Tokyo (JP); Jae Kyung Kim, Tokyo (JP)

(73) Assignee: FURUKAWA ELECTRIC CO., LTD, Tokyo (JP)

(*) Notice: Subject to any disclaimer, the term of this patent is extended or adjusted under 35 U.S.C. 154(b) by 668 days.

(21) Appl. No.: 16/144,304

(22) Filed: Sep. 27, 2018

(65) Prior Publication Data

US 2019/0031858 A1 Jan. 31, 2019

Related U.S. Application Data

(63) Continuation of application No. PCT/JP2017/013022, filed on Mar. 29, 2017.

(30) Foreign Application Priority Data

Mar. 31, 2016 (JP) .............................. JP2016-073611

(51) Int. Cl.

| | |
|---|---|
| *C08L 1/02* | (2006.01) |
| *C08L 23/06* | (2006.01) |
| *C08L 23/08* | (2006.01) |
| *C08L 23/16* | (2006.01) |
| *C08L 101/12* | (2006.01) |
| *C08K 5/19* | (2006.01) |
| *C08K 5/34* | (2006.01) |
| *C08K 7/08* | (2006.01) |

(52) U.S. Cl.
CPC ................. *C08L 1/02* (2013.01); *C08K 5/19* (2013.01); *C08K 5/34* (2013.01); *C08K 7/08* (2013.01); *C08L 23/06* (2013.01); *C08L 23/0815* (2013.01); *C08L 23/16* (2013.01); *C08L 101/12* (2013.01); *C08L 2207/062* (2013.01)

(58) Field of Classification Search
CPC ........ C08L 1/02; C08L 23/06; C08L 23/0815; C08L 23/16; C08L 101/12; C08L 2207/062; C08K 5/19; C08K 5/34; C08K 7/08
USPC ........................................................ 524/106
See application file for complete search history.

(56) References Cited

U.S. PATENT DOCUMENTS

| | | |
|---|---|---|
| 3,645,939 A | 2/1972 | Gaylord |
| 3,856,724 A | 12/1974 | O'Connor et al. |
| 4,380,522 A | 4/1983 | Georlette et al. |
| 2004/0214925 A1 | 10/2004 | Sigworth |
| 2005/0288484 A1 | 12/2005 | Holbrey et al. |
| 2006/0054058 A1 | 3/2006 | Balliello |
| 2008/0146701 A1 | 6/2008 | Sain et al. |
| 2008/0188636 A1 | 8/2008 | Argyropoulos et al. |
| 2011/0086948 A1 | 4/2011 | Hong et al. |
| 2012/0225976 A1 | 9/2012 | Bampi |
| 2013/0001477 A1 | 1/2013 | Kimura et al. |
| 2013/0209523 A1 | 8/2013 | Ichikawa et al. |
| 2014/0073776 A1 | 3/2014 | Shiramizu et al. |
| 2014/0336309 A1 | 11/2014 | Sakata et al. |
| 2015/0105499 A1 | 4/2015 | Yano et al. |
| 2016/0075877 A1 | 3/2016 | Kaiser |
| 2017/0002182 A1 | 1/2017 | Imai et al. |
| 2019/0023877 A1 | 1/2019 | Kozawa et al. |
| 2019/0023882 A1 | 1/2019 | Kim et al. |
| 2019/0031858 A1 | 1/2019 | Kozawa et al. |
| 2021/0024722 A1 | 1/2021 | Fujihashi et al. |

FOREIGN PATENT DOCUMENTS

| | | |
|---|---|---|
| CN | 87108108 A | 8/1988 |
| CN | 102093734 A | 6/2011 |
| CN | 103360619 A | 10/2013 |
| CN | 104292412 A | 1/2015 |
| CN | 104761554 A | 7/2015 |
| CN | 108779310 A | 11/2018 |
| CN | 108834420 A | 11/2018 |
| CN | 108884328 A | 11/2018 |

(Continued)

OTHER PUBLICATIONS

JP 2005187524 A—machine translation (Year: 2005).*
JP2016017096 A—machine translation (Year: 2016).*
JP2012-207063A—machine translation (Year: 2012).*
English translation of the International Search Report and Written Opinion of the International Searching Authority (forms PCT/ISA/210 and PCT/ISA/237), dated Jul. 4, 2017, for International Application No. PCT/JP2017/013023.
English translation of the International Search Report and Written Opinion of the International Searching Authority (forms PCT/ISA/210 and PCT/ISA/237), dated Jul. 4, 2017, for International Application No. PCT/JP2017/013024.

(Continued)

*Primary Examiner* — Ling Siu Choi
*Assistant Examiner* — Ronald Grinsted
(74) *Attorney, Agent, or Firm* — Birch, Stewart, Kolasch & Birch, LLP

(57) ABSTRACT

A thermoplastic resin composition, containing a thermoplastic synthetic resin, a cellulose and an ionic compound; in which a content of the cellulose is from 1 to 100 parts by mass, with respect to 100 parts by mass of the thermoplastic synthetic resin, and a content of the ionic compound is 0.001 times or more and less than 1.000 time of the content of the cellulose;
  a method of producing a thermoplastic resin composition;
  a molded article of a cellulose-reinforced resin; and
  a method of producing a molded article of a cellulose-reinforced resin.

16 Claims, No Drawings

(56) References Cited

FOREIGN PATENT DOCUMENTS

| | | |
|---|---|---|
| EP | 0 822 223 A1 | 2/1998 |
| EP | 0897943 A2 | 2/1999 |
| EP | 2 492 305 A1 | 8/2012 |
| JP | 48-10612 B1 | 4/1973 |
| JP | 55-131031 A | 10/1980 |
| JP | 62-39642 A | 2/1987 |
| JP | 63-33448 A | 2/1988 |
| JP | 9-316248 A | 12/1997 |
| JP | 10-1575 A | 1/1998 |
| JP | 2001-181513 A | 7/2001 |
| JP | 3479661 B2 | 12/2003 |
| JP | 2005-187524 A | 7/2005 |
| JP | 2005187524 A * | 7/2005 |
| JP | 2009-167250 A | 7/2009 |
| JP | 2012-207063 A | 10/2012 |
| JP | 2012207063 A * | 10/2012 |
| JP | 2012-214563 A | 11/2012 |
| JP | 2013-107987 A | 6/2013 |
| JP | 2013-248824 A | 12/2013 |
| JP | 2014-001361 A | 1/2014 |
| JP | 2014-193959 A | 10/2014 |
| JP | 2015-203093 A | 11/2015 |
| JP | 2016-017096 A | 2/2016 |
| JP | 2016017096 A * | 2/2016 |
| JP | 2017-128717 A | 7/2017 |
| JP | 2017-171698 A | 9/2017 |
| KR | 10-1023928 B1 | 3/2011 |
| WO | WO 03/029329 A2 | 4/2003 |
| WO | WO 2011/118407 A1 | 9/2011 |
| WO | WO 2013/133093 A1 | 9/2013 |
| WO | WO 2015/039237 A1 | 3/2015 |
| WO | WO 2015/053226 A1 | 4/2015 |
| WO | WO 2015/111619 A1 | 7/2015 |
| WO | WO 2015/152189 A1 | 10/2015 |
| WO | WO 2017/141779 A1 | 8/2017 |
| WO | WO 2017/170745 A1 | 10/2017 |
| WO | WO 2017/170746 A1 | 10/2017 |
| WO | WO 2017/170747 A | 10/2017 |

OTHER PUBLICATIONS

Partial Supplemental European Search Report for European Application 17775280.5, dated Aug. 26, 2019.
Partial Supplemental European Search Report, dated Aug. 28, 2019, for European Application No. 17775281.3.
Chinese Office Action for Chinese Application No. 201780017841.5, dated Dec. 10, 2020, with English translation.
Office Action dated Mar. 25, 2021 in Chinese Patent Application No. 201780017841.5, with English translation.
Japanese Office Action, dated Feb. 9, 2021, for Japanese Application No. 2018-509368, with an English machine translation.
Japanese Office Action, dated Feb. 9, 2021. for Japanese Application No. 2018-509369. with an English machine translation.
Japanese Office Action, dated Feb. 9, 2021, for Japanese Application No. 2018-509370, with an English machine translation.
Chinese Office Action and Search Report for Chinese Application No. 201780017841.5, dated Jul. 3, 2020, with English translation of the Office Action.
Chinese Office Action and Search Report for Chinese Application No. 201780018439.9, dated Aug. 26, 2020, with English translation of the Office Action.
Extended European Search Report for European Application No. 20170209.9, dated Sep. 15, 2020.
Chinese Office Action and Search Report for Chinese Application No. 201780017867.X, dated Apr. 6, 2021, with English translation.
Extended European Search Report for European U.S. Appl. No. 17775279.7, dated Oct. 8, 2019.
Chinese Office Action and Search Report for Chinese Application No. 201780017867.X, dated Sep. 3, 2020, with English translation of the Office Action.
U.S. Appl. No. 16/143,846, filed Sep. 27, 2018.
U.S. Appl. No. 16/144,430, filed Sep. 27, 2018.
International Search Report (PCT/ISA/210) issued in PCT/JP2017/013022, dated Jun. 27, 2017.
Written Opinion (PCT/ISA/237) issued in PCT/JP2017/013022, dated Jun. 27, 2017.
Office Action dated Dec. 16, 2021 in copending U.S. Appl. No. 16/144,430.
U.S. Office Action, dated Jun. 18, 2021, for U.S. Appl. No. 16/144,430.
U.S. Office Action, dated Jun. 23, 2021, for U.S. Appl. No. 16/143,846.
Chinese Office Action for Chinese Application No. 201780018439.9, dated Jun. 3, 2021, with English translation.
Chinese Office Action, dated Sep. 3, 2021, for Chinese Application No. 201780017867.X, with an English translation.
Chinese Office Action and Search Report for Chinese Application No. 201880063819.9, dated Jan. 24, 2022, with English translation.
Chinese Office Action and Search Report for Chinese Application No. 201880063823.5, dated Jan. 29, 2022, with English translation.
Chinese Office Action for Chinese Application No. 201780017867.X, dated Dec. 22, 2021, with English translation.
Chinese Office Action for Chinese Application No. 201780018439.9, dated Feb. 9, 2022, with English translation.
Chinese Office Action for Chinese Application No. 201880063819.9, dated Jun. 29, 2021.
Chinese Office Action for Chinese Application No. 201880063823.5, dated Jul. 5, 2021.
Chinese Office Action for Chinese Application No. 201880063825.4, dated Jan. 30, 2022, with English translation.
Chinese Office Action for Chinese Application No. 201880063825.4, dated Jul. 5, 2021.
Duan et al., "Natural Polymeric Materials," Huazhong University of Science and Technology Press, Wuhan, Jun. 2011, (6 pages total), with an English translation.
Extended European Search Report for European Application No. 18860137.1, dated Jun. 4, 2021.
Extended European Search Report for European Application No. 18860626.3, dated Jun. 4, 2021.
Extended European Search Report for European Application No. 18863337.4. dated May 11, 2021.
International Preliminary Report on Patentability and English translation of the Written Opinion of the International Searching Authority for International Application No. PCT/JP2018/036582, dated Mar. 31, 2020.
International Preliminary Report on Patentability and English translation of the Written Opinion of the International Searching Authority for International Application No. PCT/JP2018/036583, dated Mar. 31, 2020.
International Preliminary Report on Patentability and English translation of the Written Opinion of the International Searching Authority for International Application No. PCT/JP2018/036584, dated Mar. 31, 2020.
Suzuki et al., "Development of continous process enabling nanofibrillation of pulp and melt compounding," Cellulose, vol. 20, 2013, pp. 201-210.
U.S. Office Action for U.S. Appl. No. 16/833,222, dated Mar. 15, 2022.
U.S. Office Action for U.S. Appl. No. 16/143,846, dated Feb. 8, 2022.
U.S. Office Action for U.S. Appl. No. 16/832,986, dated Apr. 22, 2021.
U.S. Office Action for U.S. Appl. No. 16/832,986, dated Mar. 15, 2022.
U.S. Office Action for U.S. Appl. No. 16/832,986, dated Sep. 7, 2021.
U.S. Office Action for U.S. Appl. No. 16/833,071, dated Apr. 23, 2021.
U.S. Office Action for U.S. Appl. No. 16/833,071, dated Aug. 23, 2021.
U.S. Office Action for U.S. Appl. No. 16/833,071, dated Nov. 2, 2021.
U.S. Office Action for U.S. Appl. No. 16/833,222, dated Apr. 30, 2021.

(56) References Cited

OTHER PUBLICATIONS

U.S. Office Action for U.S. Appl. No. 16/833,222, dated Sep. 20, 2021.
Wang, "Principles and Applications of Polymer Blend Modification," China Light Industry Press, 2017, pp. 192-193 (6 pages total), with English translation.
Britannica, The Editors of Encyclopaedia, "kraft process," Encyclopedia Britannica, Sep. 7, 2015, https://www.britannica.com/technology/kraft-process, accessed Apr. 23, 2022, 1 page total.
U.S. Office Action for U.S. Appl. No. 16/144,430, dated Aprii 28, 2022.
Chinese Office Action for Chinese Application No. 201780018439.9, dated May 30, 2022, including an English translation.
Japanese Office Action for Japanese Application No. 2019-545198, dated May 30, 2022, including an English translation.
U.S. Notice of Allowance for U.S. Appl. No. 16/143,846, dated Jun. 10, 2022.
European Communication pursuant to Article 94(3) EPC for European Application No. 17775281.3, dated Aug. 24, 2022.
U.S. Notice of Allowance for U.S. Appl. No. 16/144,430, dated Nov. 17, 2022.

* cited by examiner

THERMOPLASTIC RESIN COMPOSITION, METHOD OF PRODUCING THERMOPLASTIC RESIN COMPOSITION, MOLDED ARTICLE OF CELLULOSE-REINFORCED RESIN, AND METHOD OF PRODUCING MOLDED ARTICLE OF CELLULOSE-REINFORCED RESIN

CROSS-REFERENCE TO RELATED APPLICATIONS

This application is a Continuation of PCT International Application No. PCT/JP2017/013022 filed on Mar. 29, 2017, which claims priority under 35 U.S.C. § 119 (a) to Japanese Patent Application No. 2016-073611 filed in Japan on Mar. 31, 2016. Each of the above applications is hereby expressly incorporated by reference, in its entirety, into the present application.

FIELD OF THE INVENTION

The present invention relates to a thermoplastic resin composition, a method of producing a thermoplastic resin composition, a molded article of a cellulose-reinforced resin, and a method of producing a molded article of a cellulose-reinforced resin.

More specifically, the present invention relates to a thermoplastic resin composition useful for a molded article of a cellulose-reinforced resin, containing cellulose, particularly plant fiber-derived cellulose, and an ionic compound; a method of producing a thermoplastic resin composition, a molded article of a cellulose-reinforced resin, and a method of producing a molded article of a cellulose-reinforced resin.

BACKGROUND OF THE INVENTION

It is known that when cellulose is miniaturized to a very small size, its mechanical properties are increased, and advancement of the miniaturization to nanosize results in a material achieving extremely high elastic modulus and high strength. A study on the use of this material as a resin-reinforcing material has been conducted and its capability has attracted attention.

As a method of producing a composite resin composed of the foregoing cellulosic tiny fiber and a thermoplastic resin, a method of at first, fibrillating (micro-fibrillation) a plant fiber and mixing and kneading the micro-fibrillated plant fiber (cellulosic tiny fiber) with a thermoplastic resin such as polypropylene using a compatibilizing agent and an inter-face reinforcing agent in order to conduct an interface control of the dispersibility and an interface control between the fiber and the resin, is known (for example, see Patent Literature 1).

However, the forgoing method includes at least a step of fibrillating (micro-fibrillation) a plant fiber and a step of mixing the micro-fibrillated plant fiber (cellulosic tiny fiber) with a thermoplastic resin thereby to form a composite. Therefore, it is the reality of the situation that the process becomes cumbersome, which results in the increase of production cost. In addition to these problems, when kneaded with the thermoplastic resin, re-aggregation is easily occurred and its control is difficult.

Recently, a method of modifying a surface of the plant fiber by a chemical treatment and then kneading the modified plant fiber with a thermoplastic resin using a processing machine is proposed (for example, see Patent Literature 2).

This method is a method of prompting miniaturization of the plant fiber, while kneading the modified plant fiber together with a thermoplastic resin in a processing machine.

However, in this method, after once swelling a plant fiber, then acting a chemical substance thereon, and then drying in the process of a chemical treatment, the plant fiber is poured into the processing machine. Therefore, this method was after all cumbersome in the process and had limitations in cost reduction, although this method is improved as compared to the above-described method.

CITATION LIST

Patent Literatures

Patent Literature 1: US 2008/0146701
Patent Literature 2: WO 2013/133093

SUMMARY OF THE INVENTION

Technical Problem

In view of the problems in the conventional method of producing a cellulose-reinforced thermoplastic resin, the present invention is contemplated to provide: a thermoplastic resin composition in which miniaturization of a plant fiber (kraft pulp) has been achieved by a simplified method in the production process for making a composite of the thermoplastic resin and the plant fiber, whereby the miniaturized plant fibers have been dispersed uniformly in the thermoplastic resin composition; a method of producing the thermoplastic resin composition; a molded article of the cellulose-reinforced resin; and a method of producing the molded article of the cellulose-reinforced resin.

Solution to Problem

As a result of intensive studies to solve the above-described problems, the present inventors found that in a step of kneading a plant fiber and a thermoplastic resin, the plant fiber is miniaturized by making an ionic substance coexist with the plant fiber, and also a cellulose-reinforced thermoplastic resin of a composite resin in which the miniaturized plant fiber is dispersed uniformly in the thermoplastic resin, is obtained.

As a result of further studies based on the above-described findings, it was found that the above-described problems are accomplished by the following constituents.

(1) A thermoplastic resin composition, containing:
  a thermoplastic synthetic resin,
  a cellulose, and
  an ionic compound;
wherein a content of the cellulose is from 1 to 100 parts by mass, with respect to 100 parts by mass of the thermoplastic synthetic resin, and
wherein a content of the ionic compound is 0.001 times or more and less than 1.000 time of the content of the cellulose.

(2) The thermoplastic resin composition described in the above item (1), wherein the ionic compound is represented by Formula (1) or (2):

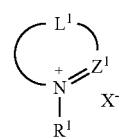

Formula (1)

-continued

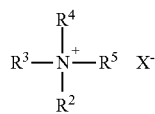

Formula (2)

wherein, in Formulas (1) and (2), $Z^1$ designates =C(Ra)— or =N—; Ra designates a hydrogen atom or a substituent; $L^1$ designates a divalent linking group; $R^1$ to $R^5$ each independently designate an alkyl group, an alkenyl group, a cycloalkyl group, an aryl group or a heterocyclic group; at least two of $R^2$ to $R^5$ may be bonded to each other to form a ring; and $X^-$ designates an anion.

(3) The thermoplastic resin composition described in the above item (2), wherein the compound represented by Formula (1) or (2) is represented by any one of Formulas (1a), (1b) and (2a) to (2c):

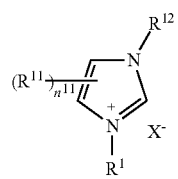

Formula (1a)

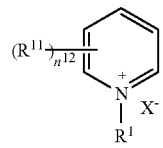

Formula (1b)

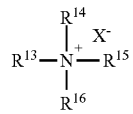

Formula (2a)

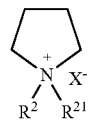

Formula (2b)

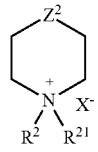

Formula (2c)

wherein, in Formulas (1a), (1b) and (2a) to (2c), $R^1$, $R^2$ and $X^-$ have the same meanings as $R^1$, $R^2$ and $X^-$ in Formula (1) or (2), respectively; $R^{11}$ and $R^{12}$ each independently designate a substituent; $n^{11}$ is an integer of 0 to 3; $n^{12}$ is an integer of 0 to 5; when there exists two or more $R^{11}$'s, the $R^{11}$'s may be the same or different from each other; at least two of $R^{11}$'s may be bonded to each other to form a ring; $R^{13}$ to $R^{15}$ each independently designate an alkyl group, an alkenyl group, a cycloalkyl group, an aryl group, or a heterocyclic group; at least two of $R^2$ and $R^{13}$ to $R^{15}$ do not bonded to each other to form any ring; $R^{21}$ has the same meaning as $R^2$; $Z^2$ designates a single bond, a methylene group, —C(=O)—, —O—, —S—, —S(=O)—, —SO₂—, —N(Rα1)-, or —N⁺(Rα1)(Rα2)-; Rα1 designates a hydrogen atom or a substituent; Rα2 designates a substituent; and Rα1 and Rα2 may be bonded to each other to form a ring.

(4) The thermoplastic resin composition described in the above item (2) or (3), wherein the $X^-$ is a halogen ion, a carboxylic acid anion, a sulfonic acid anion, a phosphate anion, a phosphonic acid anion, a dicyanamide ion, or a bis(trifluoromethanesulfonyl)imide ion.

(5) The thermoplastic resin composition described in any one of the above items (1) to (4), wherein the cellulose is plant fiber-derived cellulose.

(6) The thermoplastic resin composition described in any one of the above items (1) to (5),
wherein the cellulose is a rod-like fiber, and
wherein 15% or more of the fiber has a short side length of 2 μm or less.

(7) The thermoplastic resin composition described in any one of the above items (1) to (6), wherein a cellulose aggregate contained in the thermoplastic resin composition has an area of less than 20,000 μm².

(8) A method of producing the thermoplastic resin composition described in any one of the above items (1) to (7), which contains blending a thermoplastic synthetic resin and a mixture of a cellulose and an ionic compound,
wherein a content of the ionic compound in the mixture is 0.1% by mass or more and less than 50% by mass.

(9) The method of producing the thermoplastic resin composition described in the above item (8), which contains a step of subjecting the thermoplastic resin composition to a kneading processing.

(10) A method of producing a molded article of a cellulose-reinforced resin, which contains employing the thermoplastic resin composition produced by the method of producing the thermoplastic resin composition described in the above item (8) or (9), thereby molding the thermoplastic resin composition.

(11) A molded article of a thermoplastic resin composition, containing:
a thermoplastic synthetic resin,
a cellulose, and
an ionic compound;
wherein a content of the cellulose is from 1 to 100 parts by mass, with respect to 100 parts by mass of the thermoplastic synthetic resin, and
wherein a content of the ionic compound is 0.001 times or more and less than 1.000 time of the content of the cellulose.

(12) A molded article of a cellulose-reinforced resin, which is obtained by molding the thermoplastic resin composition described in any one of the above items (1) to (7).

Effects of Invention

The thermoplastic resin composition and the method of producing the thermoplastic resin composition according to the present invention allowed miniaturization of the plant fiber (kraft pulp) by a simplified method in the production process for making a composite of the thermoplastic resin and the plant fiber and further allowed provision of a molded article of a cellulose-reinforced resin containing the resultantly miniaturized cellulose which have been dispersed uniformly in the thermoplastic resin composition with neither aggregation nor re-aggregation; and also provision of a method of producing the molded article of the cellulose-reinforced resin.

In other words, simply by kneading the plant fiber-derived cellulose (pulp) containing an ionic compound, with the thermoplastic resin, miniaturization of the pulp can be promoted in this process.

Therefore, a step of preliminarily miniaturizing the plant fiber-derived cellulose becomes unnecessary, and this holds promise of a great reduction in production cost. Further, because the elastic modulus is increased by the miniaturized cellulose, reinforcement efficiency to the thermoplastic resin can be enhanced.

In this way, the simple and convenient method of the present invention allows a production of the cellulose-reinforced resin due to a miniaturized cellulose fiber, or a production of the molded article thereof, and this holds promise of a great reduction in production cost. Further, a wide use of the cellulose-reinforced resin or the molded article thereof according to the present invention also holds promise of reduction in weight, improved strength, reduction in thickness and when it is discarded, reduction in burned ash, and the like.

DESCRIPTION OF EMBODIMENTS

The thermoplastic resin composition and the molded article of the cellulose-reinforced resin according to the present invention each contain a thermoplastic synthetic resin, a cellulose, and an ionic compound. Herein, a content of the cellulose is from 1 to 100 parts by mass with respect to 100 parts by mass of the thermoplastic synthetic resin, and a content of the ionic compound is 0.001 times or more and less than 1.000 time of the cellulose.

Further, the method of producing the thermoplastic resin composition according to the present invention includes a step of blending a thermoplastic synthetic resin and a mixture of cellulose and an ionic compound. A content of the ionic compound in the mixture is 0.1% by mass or more and less than 50% by mass.

Further, the method of producing the molded article of the cellulose-reinforced resin according to the present invention is performed by molding the above-described thermoplastic resin composition.

<<Thermoplastic Resin Composition>>

The thermoplastic resin composition of the present invention at least contains a thermoplastic synthetic resin, a cellulose, and an ionic compound.

First, the thermoplastic synthetic resin is described below.

<Thermoplastic Synthetic Resin>

The thermoplastic synthetic resin for use in the present invention is not particularly limited. Therefore, any type of synthetic resin may be acceptable, as long as it is commonly used as a thermoplastic synthetic resin.

This is for the reason explained below.

In the present invention, as described below, miniaturization of the cellulose is realized by kneading a cellulose and an ionic compound in a thermoplastic synthetic resin.

Therefore, a viscosity of the thermoplastic synthetic resin when mixing with the cellulose becomes an important property.

Specifically, the stress (Fh) which a dispersing element of the cellulose (containing an ionic compound) present in the thermoplastic synthetic resin gets in the shear field, is simply expressed by Equation (1.1).

$$F_h = 6.12 \eta \dot{\gamma} R \quad (1.1)$$

Meanwhile, in Equation (1.1), hereinafter the dotted γ is referred to simply as γ.

The stress (Fh) which the above-described dispersing element gets in the shear field expresses a force that a spherical filler of radius R gets in the thermoplastic synthetic resin having a shear rate γ and a viscosity η.

In this regard, it is considered that the cellulose present in the thermoplastic synthetic resin is not spherical, but in the fibrous form. Therefore, this Equation cannot be used in unchanged form. However, because the spherical form and the fibrous form are the same in principle, the parameters (η, γ, R) having an effect on a stress (Fh) which the above-described dispersing element gets in the shear field are also the same in both parties.

Accordingly, in order to miniaturize the cellulose, it is important how much force is applied in the shear field of the thermoplastic synthetic resin. Therefore, it is considered that the greater advantage is given with the larger η or γ.

Herein, to increase the shear rate (γ) means to increase the shear rate to be mechanically applied to the thermoplastic synthetic resin.

Accordingly, if the shear rate (γ) is increased, a force which the cellulose gets in the thermoplastic synthetic resin becomes large. However, a frictional force due to kneading also becomes large, which results in temperature rise of the thermoplastic synthetic resin.

However, in general, the cellulose has properties of causing change in color at more than 200° C. and of initiating a thermal decomposition at around 300° C. or more. Therefore, a method of laying the cellulose in the shear field which drastically increases a temperature is not proper from the viewpoint of maintaining the properties as the material.

From the above, increase in viscosity (η) of the thermoplastic synthetic resin becomes important for miniaturization of the cellulose.

In general, the viscosity (η) of the thermoplastic synthetic resin satisfies the following relationship (Andrade's equation).

$$\eta = A e^{Ev/RT} \quad (1.2)$$

Herein, A designates proportional constant, Ev designates fluid activation energy, R designates gas constant, and T designates temperature (K). The fluid activation energy corresponds to activation energy in the Arrhenius chemical reaction. This is understood by regarding the flow as a rate process.

Accordingly, an important parameter in order to control the viscosity (η) is a temperature.

The temperature can be manipulated and adjusted as a processing temperature, regardless of the kind of the thermoplastic synthetic resin.

Accordingly, the thermoplastic synthetic resin as a medium which grants power necessary to miniaturize the cellulose is a resin that can be widely used without any particular limitation of the kind thereof.

Examples of the thermoplastic synthetic resin include a polyolefin resin, a polyester resin, a polycarbonate resin, a polyamide resin, a polyimide resin, a polyurethane resin, a polyphenylenesulfide resin, a polyphenylene oxide resin, a cellulose acylate resin, a phenol resin, a melamine resin, an epoxy resin, a phenoxy resin, and a silicon resin.

Among these, the polyolefin resin is preferable in the present invention.

<Polyolefin Resin>

The polyolefin resin used in the present invention is a polyolefin resin prepared by polymerizing at least one kind of olefin, and the polyolefin resin may be a homopolymer or a copolymer.

The specific examples of such olefin include α-olefin having 4 to 12 carbon atoms including ethylene, propylene, isobutylene, and isobutene (1-butene), butadiene, isoprene, (meth)acrylic acid ester, (meth)acrylic acid, (meth)acrylamide, vinyl alcohol, vinyl acetate, vinyl chloride, styrene, and acrylonitrile.

In addition, specific examples of the α-olefin having 4 to 12 carbon atoms include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene.

Specific examples of the polyolefin resin include a polyethylene resin, a polypropylene resin, a polyisobutylene resin, a polyisobutene resin, a polyisoprene resin, a polybutadiene resin, a (meth)acrylic resin (that is, an allyl resin), a vinyl resin such as a poly(vinyl chloride) resin, a poly(meth)acrylamide resin, a polystyrene resin, an acrylonitrile-butadiene-styrene copolymer resin (ABS resin), an ethylene-(meth)acrylate copolymer and an ethylene-vinyl acetate copolymer.

Among these resins, a polyethylene resin, a polypropylene resin, and an acrylonitrile-butadiene-styrene copolymer resin (ABS resin) are preferable, and a polyethylene resin and a polypropylene resin are more preferable.

Examples of the polyethylene resin include an ethylene homopolymer, an ethylene-α-olefin copolymer, and the like. As the α-olefin, 1-butene, 1-pentene, 1-hexene, and 1-octene are preferable.

Specific examples of the ethylene-α-olefin copolymer include an ethylene-1-butene copolymer, an ethylene-1-pentene copolymer, an ethylene-1-hexene copolymer, an ethylene-1-octene copolymer, and the like.

In addition, in a case where classification is made depending on density or shape, any of a high density polyethylene (HDPE), a low density polyethylene (LDPE), a very low density polyethylene (VLDPE), a linear low density polyethylene (LLDPE) and an ultra-high molecular weight polyethylene (UHMW-PE) may be used.

Specific examples of the polypropylene resin include a propylene homopolymer, a propylene-ethylene random copolymer, a propylene-α-olefin random copolymer, a propylene-ethylene-α-olefin copolymer and a propylene block copolymer (composed of a propylene homopolymer component or a copolymer component mainly composed of propylene, and a copolymer obtained by copolymerizing propylene with at least one kind of a monomer selected from ethylene and α-olefin). These polypropylene resins may be used singly or two or more kinds thereof may be used in combination.

As the α-olefin used in the polypropylene resin, 1-butene, 1-pentene, 1-hexene, 4-methyl-1-pentene, 1-octene, and 1-decene are preferable, and 1-butene, 1-hexene, and 1-octene are more preferable.

Specific examples of the propylene-α-olefin random copolymer include a propylene-1-butene random copolymer, a propylene-1-hexene random copolymer, and a propylene-1-octene random copolymer.

Specific examples of the propylene-ethylene-α-olefin copolymer include a propylene-ethylene-1-butene copolymer, a propylene-ethylene-1-hexene copolymer, and a propylene-ethylene-1-octene copolymer.

Specific examples of the propylene block copolymer include a (propylene)-(propylene-ethylene) copolymer, a (propylene)-(propylene-ethylene-1-butene) copolymer, a (propylene)-(propylene-ethylene-1-hexene) copolymer, a (propylene)-(propylene-1-butene) copolymer, a (propylene)-(propylene-1-hexene) copolymer, a (propylene-ethylene)-(propylene-ethylene) copolymer, a (propylene-ethylene)-(propylene-ethylene-1-butene) copolymer, a (propylene-ethylene)-(propylene-ethylene-1-hexene) copolymer, a (propylene-ethylene)-(propylene-1-butene) copolymer, a (propylene-ethylene)-(propylene-1-hexene) copolymer, a (propylene-1-butene)-(propylene-ethylene) copolymer, a (propylene-1-butene)-(propylene-ethylene-1-butene) copolymer, a (propylene-1-butene)-(propylene-ethylene-1-hexene) copolymer, a (propylene-1-butene)-(propylene-1-butene) copolymer and a (propylene-1-butene)-(propylene-1-hexene) copolymer.

Among these polypropylene resins, a propylene homopolymer, a propylene-ethylene random copolymer, a propylene-1-butene random copolymer, a propylene-ethylene-1-butene copolymer, and a propylene block copolymer component are preferable.

Crystallinity of the polypropylene resin is determined by a melting temperature (melting point) or stereoregularity, and adjusted according to quality required for the polyolefin resin composition of the present invention, and quality required for a molded article obtained by molding the composition.

In addition, the stereoregularity refers to an isotactic index or a syndiotactic index.

The isotactic index can be determined by a $^{13}$C-NMR method described in Macromolecules, Vol. 8, p. 687 (1975). Specifically, the isotactic index of the polypropylene resin is determined as an area fraction of an mmmm peak in a total absorption peak in a carbon region of a methyl group in a $^{13}$C-NMR spectrum.

A material having a high isotactic index has high crystallinity, and the isotactic index is preferably 0.96 or more, more preferably 0.97 or more, and further preferably 0.98 or more.

On the other hand, the syndiotactic index can be determined by a method described in J. Am. Chem. Soc., 110, 6255 (1988) or Angew. Chem. Int. Ed. Engl., 1955, 34, 1143-1170. A material having a high syndiotactic index has high crystallinity.

In addition, as the polyolefin resin, a modified polyolefin resin may be used, or a modified polyolefin resin may be contained in a non-modified polyolefin resin.

Examples thereof include graft modification with unsaturated carboxylic acid or a derivative thereof, and specific examples of the unsaturated carboxylic acid include maleic acid, fumaric acid, itaconic acid, acrylic acid, and methacrylic acid, and specific examples of the derivative of unsaturated carboxylic acid include maleic acid anhydride, itaconic acid anhydride, methyl acrylate, ethyl acrylate, butyl acrylate, glycidyl acrylate, methyl methacrylate, ethyl methacrylate, butyl methacrylate, glycidyl methacrylate, monoethyl maleate, diethyl maleate, monomethyl fumarate and dimethyl fumarate. Among these unsaturated carboxylic acids and/or the derivatives thereof, acrylic acid, methacrylic acid glycidyl ester and maleic anhydride are preferable.

Specific examples of the acrylic resin include homopolymers or copolymers of acrylic monomer such as (meth)acrylic acid, (meth)acrylic acid ester, and acrylonitrile, and copolymers of acrylic monomer and other monomer.

Among them, specific examples of the (meth)acrylic acid ester include methyl (meth)acrylate, ethyl (meth)acrylate, propyl (meth)acrylate, butyl (meth)acrylate, (meth)acrylic acid alkyl ester having an alkyl group having 1 to 10 carbon atoms, such as 2-ethylhexyl (meth)acrylate, hydroxyalkyl (meth)acrylate such as hydroxyethyl (meth)acrylate, and (meth)acrylic acid glycidyl ester.

Specific examples of the homopolymer or the copolymer of the acrylic monomer include a poly(meth)acrylate, an acrylic acid ester-methacrylic acid ester copolymer, and a polyacrylonitrile. Specific examples of the copolymer of the acrylic monomer with other monomer include a (meth) acrylic acid ester-styrene copolymer, a (meth)acrylic acid-styrene copolymer, an acrylonitrile-butadiene-styrene copolymer, an acrylonitrile-styrene copolymer, and an acrylonitrile-styrene-(meth)acrylic acid ester copolymer.

Specific examples of the vinyl resin include a vinyl chloride resin [a homopolymer of a vinyl chloride monomer (poly(vinyl chloride) resin and the like), a copolymer of a vinyl chloride monomer with other monomer (a vinyl chloride-vinyl acetate copolymer, a vinyl chloride-(meth)acrylic acid ester copolymer) and the like], a vinyl alcohol resin (a homopolymer such as poly(vinyl alcohol), a copolymer such as an ethylene-vinyl alcohol copolymer and the like), and a poly(vinyl acetal) resin such as poly(vinyl formal). These vinyl resins can be used singly or two or more kinds thereof can be used in combination.

Melt flow rate of the polyolefin resin is usually 0.01 to 400 g/10 minutes, and from the standpoint of enhancing mechanical strength and production stability, 0.1 to 400 g/10 minutes is preferable, and 0.5 to 200 g/10 minutes is more preferable.

Meanwhile, MFR is a mass of the polymer which outflows per 10 minutes (g/10 min) at 190° C. under a load of 2.16 kg in conformity with JIS K7210, unless otherwise indicated.

<Cellulose>

The cellulose used in the present invention is fibrous cellulose, preferably plant fiber-derived cellulose, and particularly preferably fine plant fibrous cellulose (powdered pulp).

The pulp is also a raw material for paper and consists primarily of a tracheid which is extracted from a plant. From a chemical viewpoint, a primary constituent of the pulp is a polysaccharide and its primary constituent is cellulose.

The plant fiber-derived cellulose is not particularly limited, and specific examples thereof include a material derived from plant, such as wood, bamboo, hemp, jute, kenaf, agricultural product remains or wastes (for example, straw of wheat or rice plant, corn, stalks of cotton, and sugar cane), cloth, regenerated pulp, waste paper and wood flour. In the present invention, a wood or a material derived from the wood is preferable, wood flour is more preferable, and a kraft pulp is particularly preferable.

Meanwhile, the kraft pulp is a collective term of the pulp in which lignin-hemicellulose has been removed from a wood or a plant raw material by a chemical processing with caustic soda or the like, whereby almost pure cellulose has been extracted.

In the present invention, by blending an ionic compound with the foregoing cellulose and then kneading the resultant mixture in the thermoplastic synthetic resin, miniaturization of the cellulose is realized.

In the plant fiber-derived cellulose, from 30 to 40 molecules are bundled to form a high-crystalline micro-fibril having a micro-width of about 3 nm in diameter and a length of several hundred nm to several ten μm, and form a structure in which these are in a bundle through a soft non-crystalline portion. The powdered cellulose (pulverized pulp) used as a raw material in the present invention is an aggregate in this bundle form. Meanwhile, it is said that the micro-fibril is in the state that the constituent cellulose molecular chain extends itself and forms a chain crystal, whereby the micro-fibril exhibits an extremely high elastic modulus and has ideally an elastic modulus of nearly 140 GPa. Further, it is known that the elastic modulus of the cellulose increase with decreasing fiber diameter. Accordingly, in order to improve the properties of the reinforced resin, its effectiveness increases with decrease in the fiber diameter and advancement in miniaturization of the cellulose dispersed in the thermoplastic synthetic resin.

In the present invention, the miniaturized cellulose is preferably a rod-like fiber.

A short side length (diameter) is preferably 2 μm or less, more preferably from 3 nm to 2 μm, more preferably from 3 nm to 1 μm, further preferably from 3 nm to 0.5 μm, and particularly preferably from 4 to 300 nm. On the other hand, a long side length (length) is preferably from 0.03 to 500 μm, and more preferably from 0.05 to 200 μm. An aspect ratio is preferably 5 or more, and more preferably 10 to 1,000. In addition, the aspect ratio is expressed in terms of a value obtained by dividing the average length by the average fiber diameter.

Further, in the present invention, as for the miniaturized cellulose, 15% or more of the cellulose fiber to be contained preferably has a short side length of 2 μm or less. The content of the cellulose fiber having a short side length of 2 μm or less is more preferably 20% or more, and further preferably 25% or more.

In the present invention, it is more preferable that the miniaturized cellulose is in the form of uniform dispersion in the thermoplastic resin composition without causing aggregation or re-aggregation.

Therefore, even if the cellulose aggregates are present, it is preferable that the area of the existing cellulose aggregates is less than 20,000 μm$^2$. Specifically, even if the cellulose aggregates are present, it is preferable that the area of the largest aggregate among the existing cellulose aggregates is less than 20,000 μm$^2$.

Meanwhile, the short side length and the area of the cellulose aggregate can be measured using an electronic microscope and an industrial microscope.

Specific measurements are given in Example.

In the present invention, the content of the cellulose is from 1 to 100 parts by mass, preferably from 5 to 70 parts by mass, and more preferably from 10 to 50 parts by mass, with respect to 100 parts by mass of the thermoplastic synthetic resin.

If the content of the cellulose is less than 1 part by mass, transmission of power to the cellulose is not effectively caused during kneading, whereby it is difficult to obtain substantially miniaturized cellulose. In reverse, if the content of the cellulose is more than 100 parts by mass, an improved dispersion of the cellulose in the thermoplastic synthetic resin becomes difficult. Consequently, a good property for its use as a material cannot be obtained.

<Ionic Compound>

The thermoplastic resin composition of the present invention contains an ionic compound together with the cellulose.

As the ionic compound used in the present invention, a compound which is generally called as an ionic liquid is preferable.

The ionic liquid is a salt which is present as a liquid in a broad temperature range and is a liquid consisting only of an ion. In general, a salt having a melting point of 100° C. or less is defined as the ionic liquid (IL) and an ionic liquid having a melting point at near room temperature is called as "RTIL (room temperature IL)".

As the ionic compound used in the present invention, a compound which is generally called as an ionic liquid is preferable. However, whether or not the melting point is more than 100° C., for example, 150° C. or more does not matter.

Specifically, in the present invention, since the cellulose is miniaturized by kneading a cellulose-reinforced resin or a cellulose-reinforced resin composition in a processing machine at the step of processing and molding the same by extrusion, injection or the like, the temperature of the working step and the processing machine can be set to a temperature which is equal to or higher than the melting point of the ionic compound. Accordingly, for example, even if the melting point of the ionic compound is 180° C., the ionic compound can hold a promise of the same function as the so-called ionic liquid by processing at a temperature which is higher than 180° C., for example, at 190° C.

In the present invention, the ionic compound is preferably an organic ionic compound, and preferred examples thereof include onium salts, such as a quaternary phosphonium salt and a quaternary ammonium salt. Among these, a compound represented by Formula (1) or (2) is preferable.

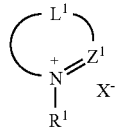

Formula (1)

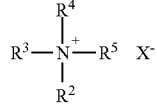

Formula (2)

In Formulas (1) and (2), $Z^1$ designates =C(Ra)— or =N—. Herein, Ra designates a hydrogen atom or a substituent. $L^1$ designates a divalent linking group. $R^1$ to $R^5$ each independently designate an alkyl group, an alkenyl group, a cycloalkyl group, an aryl group or a heterocyclic group. At least two of $R^2$ to $R^5$ may be bonded to each other to form a ring. $X^-$ designates an anion.

$Z^1$ is =C(Ra)— or =N—, and preferably =C(Ra)—.

Examples of the substituent for Ra include an alkyl group, an alkenyl group, a cycloalkyl group, an aryl group, a heterocyclic group, an alkoxy group, an aryloxy group, an alkylthio group, an arylthio group, an amino group, an acyl group, an acylamino group, a sulfonamide group, a carbamoyl group, a sulfamoyl group, an alkoxycarbonyl group, an aryloxycarbonyl group, an acyloxy group, a sulfonyl group, a halogen atom, a hydroxy group, a carboxy group, and a sulfo group.

The number of carbon atoms of the alkyl group is preferably 1 to 20, more preferably 1 to 12, and further preferably 1 to 8.

Examples of the alkyl group include methyl, ethyl, n-propyl, isopropyl, n-butyl, isobutyl, t-butyl, n-pentyl, t-pentyl, n-hexyl, n-pentyl, n-octyl, 2-ethylhexyl, n-octyl, n-decyl, n-dodecyl, n-hexadecyl, and n-octadecyl.

The alkyl group may have a substituent, and examples of such a substituent include the substituents for Ra.

The number of carbon atoms of the alkenyl group is preferably 2 to 20, more preferably 2 to 12, and further preferably 2 to 8.

Examples of the alkenyl group include vinyl, allyl, and oleyl.

The alkenyl group may have a substituent, and examples of such a substituent include the substituents for Ra.

The cycloalkyl group is preferably a 3- to 7-membered cycloalkyl group, more preferably a 3-, 5- or 7-membered cycloalkyl group, and further preferably 5- or 6-membered cycloalkyl group.

The number of carbon atoms of the cycloalkyl group is preferably 3 to 20, more preferably 3 to 12, further preferably 5 to 12, and particularly preferably 5 to 8.

Examples of the cycloalkyl group include cyclopropyl, cyclopentyl, and cyclohexyl.

The cycloalkyl group may have a substituent, and examples of such a substituent include the substituents for Ra.

The number of carbon atoms of the aryl group is preferably 6 to 20, more preferably 6 to 12, and further preferably 6 to 8.

Examples of the aryl group include phenyl and naphthyl.

The aryl group may have a substituent, and examples of such a substituent include the substituents for Ra.

As the heterocycle of the heterocyclic group, it is preferable that a hetero atom which constitutes the heterocycle is selected from the group consisting of an oxygen atom, a sulfur atom and a nitrogen atom, and the heterocycle is a 5- or 7-membered ring. In addition, the heterocycle may be an aromatic ring, an unsaturated ring, or a saturated ring.

The number of carbon atoms of the heterocyclic group is preferably 0 to 20, more preferably 1 to 12, and further preferably 1 to 8.

The heterocycle of the heterocyclic group include a furan ring, a thiophene ring, a pyrrole ring, an imidazole ring, a pyrazole ring, a triazole ring, a tetrazole ring, an oxazole ring, a thiazole ring, a pyridine ring, a pyrazine ring, a pyrimidine ring, a pyridazine ring, a triazine ring, an indoline ring, a tetrahydrofuran ring, a tetrahydrothiophene ring, a pyrrolidine ring, a pyrrolidine ring, an imidazolidine ring, an imidazoline ring, a pyrazolidine ring, a piperidine ring, a piperazine ring, a morpholine ring, a thiomorpholine ring, a 1,1-dioxothiomorpholine ring, a 1-oxomorpholine ring, a quinuclidine ring, a 1,4-diazabicyclo[2.2.2]octane ring, and a cyanuric acid ring.

Further, the heterocycle also includes benzene ring- or other ring-condensed heterocycles, such as a benzofuran ring, a benzothiophene ring, a benzoimidazole ring, a benzopyrazole ring, a benzotriazole ring, a benzooxazole ring, and a benzothiazole ring.

The heterocyclic group may have a substituent, and examples of such a substituent include the substituents for Ra.

The number of carbon atoms of the alkoxy group is preferably 1 to 20, more preferably 1 to 12, and further preferably 1 to 8.

Examples of the alkoxy group include methoxy, ethoxy, n-propoxy, isopropoxy, n-butoxy, isobutoxy, t-butoxy, n-pentyloxy, t-pentyloxy, n-hexyloxy, n-pentyloxy, n-octyloxy, 2-ethylhexyloxy, n-octyloxy, n-decyloxy, n-dodecyloxy, n-hexadecyloxy, and n-octadecyloxy.

The alkoxy group may have a substituent, and examples of such a substituent include the substituents for Ra.

The number of carbon atoms of the aryloxy group is preferably 6 to 20, more preferably 6 to 12, and further preferably 6 to 8.

Examples of the aryloxy group include phenoxy and naphthoxy.

The aryloxy group may have a substituent, and examples of such a substituent include the substituents for Ra.

The number of carbon atoms of the alkylthio group is preferably 1 to 20, more preferably 1 to 12, and further preferably 1 to 8.

Examples of the alkylthio group include methylthio, ethylthio, n-propylthio, isopropylthio, n-butylthio, isobutylthio, t-butylthio, n-pentylthio, t-pentylthio, n-hexylthio, n-pentylthio, n-octylthio, 2-ethylhexylthio, n-octylthio, n-decylthio, n-dodecylthio, n-hexadecylthio, and n-octadecylthio.

The alkylthio group may have a substituent, and examples of such a substituent include the substituents for Ra.

The number of carbon atoms of the arylthio group is preferably 6 to 20, more preferably 6 to 12, and further preferably 6 to 8.

Examples of the arylthio group include phenylthiol and naphthylthio.

The arylthio group may have a substituent, and examples of such a substituent include the substituents for Ra.

The amino group include an amino group, an alkylamino group, an arylamino group, and a heterocyclic amino group. The number of carbon atoms of the amino group is preferably 0 to 20, more preferably 0 to 12, further preferably 1 to 12, and particularly preferably 1 to 8.

Examples of the amino group include amino, methylamino, dimethylamino, ethylamino, diethylamino, isopropylamino, di-n-propylamino, 2-ethylhexylamino, n-octylamino, dodecylamino, phenylamino, diphenylamino, and phenylmethylamino.

The amino group may have a substituent, and examples of such a substituent include the substituents for Ra.

The acyl group include a formyl group, an alkanoyl group, a cycloalkanoyl group, an alkenoyl group, an aryloyl group, and a heterocyclic carbonyl group.

The number of carbon atoms of the acyl group is preferably 1 to 20, more preferably 2 to 12, further preferably 2 to 12, and particularly preferably 2 to 8.

Examples of the acyl group include formyl, acetyl, propionyl, butyryl, valeryl, pivaloyl, lauroyl, palmitoyl, stearoyl, cyclopropylcarbonyl, cyclopentylcarbonyl, cyclohexylcarbonyl, acryloyl, methacryloyl, oleyl, benzoyl, naphthoyl, nicotinoyl, and isonicotinoyl.

The acyl group may have a substituent, and examples of such a substituent include the substituents for Ra.

Examples of the acylamino group include amino groups in which the above-described acyl group is substituted with a nitrogen atom. The number of carbon atoms of the acylamino group is preferably 1 to 20, more preferably 2 to 12, further preferably 2 to 12, and particularly preferably 2 to 8.

Examples of the acylamino group include formylamino, acetylamino, propionylamino, butyrylamino, valerylamino, pivaloylamino, lauroylamino, palmitoylamino, stearoylamino, cyclopropylcarbonyl amino, cyclopentylcarbonyl amino, cyclohexylcarbonyl amino, acryloylamino, methacryloylamino, oleylamino, benzoylamino, naphthoylamino, nicotinoylamino, and isonicotinoylamino.

The acylamino group may have a substituent, and examples of such a substituent include the substituents for Ra.

The sulfonamide group include an alkylsulfonamide group, a cycloalkylsulfonamide group, an arylsulfonamide group, and a heterocyclic sulfonamide group.

The number of carbon atoms of the sulfonamide group is preferably 1 to 20, more preferably 2 to 12, further preferably 2 to 12, and particularly preferably 2 to 8.

Examples of the sulfonamide group include methanesulfonamide, ethanesulfonamide, propanesulfonamide, octanesulfonamide, cyclopentanesulfonamide, cyclohexanesulfonamide, benzenesulfonamide, and naphthalenesulfonamide.

The sulfonamide group may have a substituent, and examples of such a substituent include the substituents for Ra.

The carbamoyl group include a carbamoyl group, an alkylcarbamoyl group, a cycloalkylcarbamoyl group, an arylcarbamoyl group, and a heterocyclic carbamoyl group.

The number of carbon atoms of the carbamoyl group is preferably 1 to 20, more preferably 2 to 12, further preferably 2 to 12, and particularly preferably 2 to 8.

Examples of the carbamoyl group include N-methylcarbamoyl, N,N-dimethylcarbamoyl, N-phenylcarbamoyl, N-phenyl-N-methylcarbamoyl, N-cyclohexylcarbamoyl, N-imidazolylcarbamoyl, pyrrolidinecarbonyl, and piperidinecarbonyl.

The carbamoyl group may have a substituent, and examples of such a substituent include the substituents for Ra.

The sulfamoyl group include a sulfamoyl group, an alkylsulfamoyl group, a cycloalkylsulfamoyl group, an arylsulfamoyl group, and a heterocyclic sulfamoyl group.

The number of carbon atoms of the sulfamoyl group is preferably 0 to 20, more preferably 1 to 12, further preferably 1 to 12, and particularly preferably 1 to 8.

Examples of the sulfamoyl group include N-methylsulfamoyl, N,N-dimethylsulfamoyl, N-phenylsulfamoyl, N-phenyl-N-methylsulfamoyl, N-cyclohexylsulfamoyl, N-imidazolylsulfamoyl, pyrrolidinesulfamoyl, piperidinesulfamoyl.

The sulfamoyl group may have a substituent, and examples of such a substituent include the substituents for Ra.

The number of carbon atoms of the alkoxycarbonyl group is preferably 2 to 20, more preferably 2 to 12, and further preferably 2 to 8.

Examples of the alkoxycarbonyl group include methoxycarbonyl, ethoxycarbonyl, n-propoxycarbonyl, isopropoxycarbonyl, n-butoxycarbonyl, isobutoxycarbonyl, t-butoxycarbonyl, n-pentyloxycarbonyl, t-pentyloxycarbonyl, n-hexyloxycarbonyl, n-pentyloxycarbonyl, n-octyloxycarbonyl, 2-ethylhexyloxycarbonyl, n-octyloxycarbonyl, n-decyloxycarbonyl, n-dodecyloxycarbonyl, n-hexadecyloxycarbonyl, and n-octadecyloxycarbonyl.

The alkoxycarbonyl group may have a substituent, and examples of such a substituent include the substituents for Ra.

The number of carbon atoms of the aryloxycarbonyl group is preferably 7 to 20, and more preferably 7 to 12.

Examples of the aryloxycarbonyl group include phenoxycarbonyl, and naphthoxycarbonyl.

The aryloxycarbonyl group may have a substituent, and examples of such a substituent include the substituents for Ra.

The acyloxy group include a formyloxy group, an alkanoyloxy group, a cycloalkanoyloxy group, an alkenoyloxy group, an aryloyloxy group, and a heterocyclic carbonyloxy group.

The number of carbon atoms of the acyloxy group is preferably 1 to 20, more preferably 2 to 12, further preferably 2 to 12, and particularly preferably 2 to 8.

Examples of the acyloxy group include formyloxy, acetyloxy, propionyloxy, butyryloxy, valeryloxy, pivaloyloxy, lauroyloxy, palmitoyloxy, stearoyloxy, cyclopropylcarbonyloxy, cyclopentylcarbonyloxy, cyclohexylcarbonyloxy, acryloyloxy, methacryloyloxy, oleyloxy, benzoyloxy, naphthoyloxy, nicotinoyloxy, and isonicotinoyloxy.

The acyloxy group may have a substituent, and examples of such a substituent include the substituents for Ra.

The sulfonyl group include an alkylsulfonyl group, a cycloalkylsulfonyl group, an arylsulfonyl group, and a heterocyclic sulfonyl group.

The number of carbon atoms of the sulfonyl group is preferably 1 to 20, more preferably 2 to 12, further preferably 2 to 12, and particularly preferably 2 to 8.

Examples of the sulfonyl group include methanesulfonyl, ethanesulfonyl, propanesulfonyl, octanesulfonyl, cyclopentanesulfonyl, cyclohexanesulfonyl, benzenesulfonyl, and naphthalenesulfonyl.

The sulfonyl group may have a substituent, and examples of such a substituent include the substituents for Ra.

Examples of the halogen atom include a fluorine atom, a chlorine atom, a bromine atom and an iodine atom.

Ra is preferably a hydrogen atom, an alkyl group, a cycloalkyl group, an aryl group, a heterocyclic group, an alkoxy group, an alkylthio group, or an amino group; more preferably a hydrogen atom, an alkyl group, a cycloalkyl group, or an aryl group; further preferably a hydrogen atom, or an alkyl group; and particularly preferably a hydrogen atom.

$L^1$ is a divalent linking group, preferably a linking group for forming a 5- or 6-membered nitrogen-containing heterocycle, more preferably a linking group for forming a 5- or 6-membered nitrogen-containing heteroaromatic ring, and particularly preferably a linking group for forming a 5-membered nitrogen-containing heteroaromatic ring, with —$N^+(R^1)=Z^1$—.

Herein, the formed nitrogen-containing heterocycle described above may be condensed with a benzene ring or another ring, and may be substituted with a substituent. Examples of such a substituent include the substituents for Ra.

As the divalent linking group in $L^1$, a linking group in which a linking atom is selected from the group consisting of a carbon atom, an oxygen atom, a sulfur atom and a nitrogen atom, is preferable.

Examples of the ring formed by the divalent linking group in $L^1$ and the —$N^+(R^1)=Z^1$— include an imidazole ring, a pyrazole ring, a triazole ring, a tetrazole ring, an oxazole ring, a thiazole ring, a pyridine ring, a pyrazine ring, a pyrimidine ring, a pyridazine ring, a triazine ring, a 1-pyrrolidine ring, an imidazoline ring, and a benzene-condensed ring thereof.

The alkyl group, the alkenyl group, the cycloalkyl group, the aryl group, and the heterocyclic group for $R^1$ to $R^5$ have the same meanings as the alkyl group, the alkenyl group, the cycloalkyl group, the aryl group, and the heterocyclic group for Ra, and preferable ranges are also the same.

The ring to be formed by binding at least two of $R^2$ to $R^5$ to each other is preferably 5- or 7-membered ring, and more preferably 5- or 6-membered ring. In addition, the ring to be formed may be an aromatic ring, an unsaturated ring, or a saturated ring; and is preferably a saturated ring.

Examples of the ring to be formed by binding two of $R^2$ to $R^5$ to each other include a pyrrolidine ring, a pyrroline ring, a pyrazolidine ring, a pyrazoline ring, a pyrrole ring, a piperidine ring, a piperazine ring, a morpholine ring, a thiomorpholine ring, a 1,1-dioxothiomorpholine ring, and a 1-oxomorpholine ring.

Examples of the ring to be formed by binding three of $R^2$ to $R^5$ to each other include a quinuclidine ring, and a 1,4-diazabicyclo[2.2.2]octane ring.

Specific examples of the cation (a portion other than $X^-$) of the compound represented by Formula (1) or (2) include the following cations:

1-alkyl-3-methyl imidazolium, such as 1-ethyl-3-methyl imidazolium, 1-butyl-3-methyl imidazolium, 1-hexyl3-methyl imidazolium, 1-octyl-3-methyl imidazolium; 1,3-dimethyl imidazolium, 1,3-diethyl imidazolium, 1,2,3-trimethyl imidazolium, 1,2,3,4-tetramethyl imidazolium, 1,3,4-trimethyl-2-ethyl imidazolium, 1,3-dimethyl-2,4-diethyl imidazolium, 1,2-dimethyl-3,4-diethyl imidazolium, 1-methyl-2,3,4-triethyl imidazolium, 1,2,3,4-tetraethyl imidazolium, 1,3-dimethyl-2-ethyl imidazolium, 1-ethyl-2,3-dimethyl imidazolium, 1,2,3-triethyl imidazolium, 1-ethyl-2,3-dimethyl imidazolium, 1-propyl-2,3-dimethyl imidazolium, 1-butyl-2,3-dimethyl imidazolium, 1-pentyl-2,3-dimethyl imidazolium, 1-hexyl-2,3-dimethyl imidazolium, 1-heptyl-2,3-dimethyl imidazolium, 1-octyl-2,3-dimethyl imidazolium, 1-cyanomethyl-3-methyl imidazolium, 1-(2-hydroxyethyl)-3-methyl imidazolium, 1-allyl-3-methyl imidazolium, 1-butyl pyridinium, 1-hexyl pyridinium, N-(3-hydroxypropyl)pyridinium, N-hexyl-4-dimethylamino pyridinium, N-(methoxyethyl)-N-methyl morpholium, 1-(2-methoxyethyl)-1-methyl pyrrolidinium, 1-(methoxyethyl)-1-methyl piperidinium, N-(methoxyethyl)-1-methyl pyrrolidinium, 1,2-dimethyl pyrazolium, N-(methoxyethyl)-2-methyl oxazolium, N-(methoxyethyl)-2-methyl thiazolium, 1,2,3-trimethyl imidazolinium, 1,2,3,4-tetramethyl imidazolinium, 1,3,4-trimethyl-2-ethyl imidazolinium, 1,3-dimethyl-2,4-diethyl imidazolinium, 1,2-dimethyl-3,4-diethyl imidazolinium, 1-methyl-2,3,4-triethyl imidazolinium, 1,2,3,4-tetraethyl imidazolinium, 1,3-dimethyl-2-ethyl imidazolinium, 1-ethyl-2,3-dimethyl imidazolinium, 1,2,3-triethyl imidazolinium, 1,1-dimethyl-2-heptyl imidazolinium, 1,1-dimethyl-2-(2-heptyl) imidazolinium, 1,1-dimethyl-2-(3-heptyl) imidazolinium, 1,1-dimethyl-2-(4-heptyl) imidazolinium, 1,1-dimethyl-2-dodecyl imidazolinium, 1,1-dimethyl imidazolinium, 1,1,2-trimethyl imidazolinium, 1,1,2,4-tetramethyl imidazolinium, 1,1,2,5-tetramethyl imidazolinium, 1,1,2,4,5-pentamethyl imidazolinium, tetramethyl ammonium, ethyl trimethyl ammonium, diethyl dimethyl ammonium, triethyl methyl ammonium, tetraethyl ammonium, trimethyl propyl ammonium, diethylmethyl(2-methoxyethyl) ammonium, N,N-diethyl-N-methyl-N-(2-methoxyethyl) ammonium, N-ethyl-N,N-dimethyl-2-methoxyethyl ammonium, trimethylbenzyl ammonium, N,N-bis(2-methoxyethyl) pyrrolidinium, N,N-bis(2-hydroxyethyl) pyrrolidinium, N-methyl-N-2-methoxyethyl pyrrolidinium, N,N-bis(2-ethylhexyl) morpholinium, N,N-bis(2-ethylhexyl) thiomorpholinium, N,N-bis(2-hydroxyethyl) piperidinium, N,N,N',N'-tetra(2-hydroxyethyl) piperazinium, N,N-bis(2-ethoxyethyl-1,1-dioxo thiomorpholinium, N,N-bis(2-ethoxyethyl-1-oxo thiomorpholinium, 1,3-dimethyl-1,4,5,6-tetrahydro pyridinium, 1,2,3-trimethyl-1,4,5,6-tetrahydro pyridinium, 1,2,3,4-tetramethyl-1,4,5,6-tetrahydro pyridinium, 1,2,3,5-tetramethyl-1,4,5,6-tetrahydro pyridinium, 1-methyl quinuclidine, 1-ethyl quinuclidine, 1-(2-hydroxyethyl) quinuclidine, 8-methyl-1,8-diazabicyclo[5.4.0]-7-undeceniunn, 5-methyl-1,5-diazabicyclo[4.3.0]-5-nonenium, 8-ethyl-1,8-diazabicyclo[5.4.0]-7-undecenium, and 5-ethyl-1,5-diazabicyclo[4.3.0]-5-nonenium.

The anion for $X^-$ may be any of an inorganic anion and an organic anion.

Examples of the inorganic anion include a halogen ion ($F^-$, $Cl^-$, $Br^-$, $I^-$), a sulfonic acid anion ($HSO_4^-$, $SO_4^{2-}$), a phosphate anion [$P(=O)(OH)_2(O^-)$, $P(=O)(OH)(O^-)_2$, $P(=O)(O^-)_3$], a phosphonic acid anion [$HP(=O)(OH)(O^-)$, $HP(=O)(O^-)_2$], a tetrafluoroborate ($PF_6^-$), $BF_4^-$, $AsF_6^-$, $SbF_6^-$, $ClO_4^-$, $AlF_4^-$, $AlCl_4^-$, $TaF_6^-$, $NbF_6^-$, $SiF_6^-$, $CN^-$, and $F(HF)n^-$ (n is an integer of 1 to 4).

Examples of the organic anion include an organic carboxylic acid anion, an organic sulfonic acid anion, an organic phosphoric acid anion, an organic phosphonic acid anion, a dicyanamide ion [$N^-(CN)_2$], an organic imide ion, an organic methide anion, an organic phosphorus anion, and an organic boron anion.

As the organic carboxylic acid anion or the organic sulfonic acid anion, any of an aliphatic carboxylic acid or sulfonic acid anion, an aromatic carboxylic acid or sulfonic acid anion, and a heterocyclic carboxylic acid or sulfonic acid anion is acceptable. Further, a polyvalent carboxylic acid or sulfonic acid anion (polyvalent anion) such as a dicarboxylic acid or a disulfonic acid is also acceptable.

A preferable anion of the organic carboxylic acid anion is represented by Formula (A).

Further, a preferable anion of the organic sulfonic acid anion is represented by Formula (B).

Rb—CO$_2^-$     Formula (A1)

Rc—SO$_3^-$     Formula (A2)

In Formulas (A1) and (A2), Rb designates a hydrogen atom, an alkyl group, a cycloalkyl group, an alkenyl group, an aryl group, or a heterocyclic group; and Rc designates an alkyl group, a cycloalkyl group, an alkenyl group, an aryl group, or a heterocyclic group.

The alkyl group, the cycloalkyl group, the alkenyl group, the aryl group and the heterocyclic group for Rb and Rc each have the same meanings as the alkyl group, the cycloalkyl group, the alkenyl group, the aryl group and the heterocyclic group for Ra. In addition, the alkyl group, the cycloalkyl group, the alkenyl group, the aryl group and the heterocyclic group may have a substituent, and examples of such a substituent include the substituents for Ra.

Examples of the organic carboxylic acid anion include a formic acid anion, an acetic acid anion, a propionic acid anion, a butyric acid anion, an isobutyric acid anion, a valeric acid anion, an isovaleric acid anion, a pivalic acid anion, a lauric acid anion, a myristic acid anion, a palmitic acid anion, a stearic acid anion, a trifluoroacetic acid anion, a trichloroacetic acid anion, an amino acid anion (e.g., each anion of glycine, glutamine, glutamic acid, arginine, arginic acid, asparagine, aspartic acid, cysteine, proline, serine, tyrosine, valine, leucine, isoleucine, methionine, phenylalanine, tryptophan, histidine, threonine, and lysine), an acrylic acid anion, a methacrylic acid anion, a crotonic acid anion, an isocrotonic acid anion, an oleic acid anion, a cinnamic acid anion, a cyclopropanecarboxylic acid anion, a cyclopentanecarboxylic acid anion, a cyclohexanecarboxylic acid anion, a benzoic acid anion, a toluic acid anion, a naphthalenecarboxylic acid anion, a nicotinic acid anion, an isonicotinic acid anion, a furoic acid (full acid) anion, thenoic acid anion, an oxalic acid mono- or di-anion, a malonic acid mono- or di-anion, a succinic acid mono- or di-anion, a glutaric acid mono- or di-anion, an adipic acid mono- or di-anion, a pimelic acid mono- or di-anion, a suberic acid mono- or di-anion, an azelaic acid mono- or di-anion, a sebacic acid mono- or di-anion, a maleic acid mono- or di-anion, a fumaric acid mono- or di-anion, a citraconic acid mono- or di-anion, a mesaconic acid mono- or di-anion, a phthalic acid mono- or di-anion, a terephthalic acid mono- or di-anion, an isophthalic acid mono- or di-anion, a camphoric acid mono- or di-anion, a 1,4-naphthalenedicarboxylic acid mono- or di-anion, a trimellitic acid mono-, di- or tri-anion, a pyromellitic acid mono- to tetra-anion, and a mellitic acid mono- to hexa-anion.

Examples of the organic sulfonic acid anion include a methanesulfonic acid anion, an ethanesulfonic acid anion, a propanesulfonic acid anion, an octanesulfonic acid anion, a 2-ethylhexanesulfonic acid anion, a cyclohexanesulfonic acid anion, a benzenesulfonic acid anion, a toluenesulfonic acid anion, a naphthalenesulfonic acid anion, a 4,6-disulfo-1-naphthalenesulfonic acid mono-, di- or tri-anion, and an o-sulfobenzenecarboxylic acid mono- or di-anion.

The organic phosphate or phosphonic acid anion is preferably an anion represented by Formula (A3).

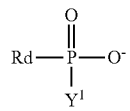

Formula (A3)

In Formula (A3), Rd designates a hydrogen atom, an alkyl group, a cycloalkyl group, an alkenyl group, an aryl group, a heterocyclic group, an alkoxy group, or an aryloxy group. $Y^1$ designates —$O^-$ or —ORe. Herein Re designates a hydrogen atom, an alkyl group, a cycloalkyl group, an alkenyl group, an aryl group, or a heterocyclic group.

The alkyl group, the cycloalkyl group, the alkenyl group, the aryl group, the heterocyclic group, the alkoxy group and the aryloxy group for Rd each have the same meanings as the alkyl group, the cycloalkyl group, the alkenyl group, the aryl group, the heterocyclic group, the alkoxy group and the aryloxy group for Ra. The alkyl group, the cycloalkyl group, the alkenyl group, the aryl group and the heterocyclic group for Re each have the same meanings as the alkyl group, the cycloalkyl group, the alkenyl group, the aryl group and the heterocyclic group for Ra.

Examples of the organic phosphate or phosphonic acid anion include a methylphosphonic acid mono- or di-anion, an ethylphosphonic acid mono- or di-anion, a propylphosphonic acid mono- or di-anion, a heptylphosphonic acid mono- or di-anion, a hexylphosphonic acid mono- or di-anion, a decylphosphonic acid mono- or di-anion, an octylphosphonic acid mono- or di-anion, a vinylphosphonic acid mono- or di-anion, an aminomethylphosphonic acid mono- or di-anion, a phenylphosphonic acid mono- or di-anion, a methylenediphosphonic acid mono- to tetra-anion, a nitrilotris(methylenephosphonic acid) mono- to hexa-anion, a 1,4-phenylenediphosphonic acid mono- to tetra-anion, a 4-phosphonobutyric acid mono-, di- or tri-anion, a p-xylylenediphosphonic acid mono- to tetra-anion, a monomethyl phosphate mono- or di-anion, a diethyl phosphate anion, a dibutyl phosphate anion, a didecyl phosphate anion, a diphenyl phosphate anion, and a phenyl phosphate mono- or di-anion.

Preferable anions of the organic imide ion, the organic methide anion, the organic phosphorus anion and the organic boron anion are represented by any of Formulas (A4) to (A7).

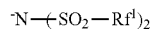

Formula (A4)

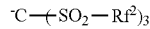

Formula (A5)

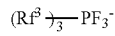

Formula (A6)

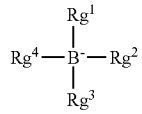

Formula (A7)

In Formulas (A4) to (A7), $Rf^1$ to $Rf^3$ designate an alkyl group substituted with a fluorine atom, or an aryl group substituted with a fluorine atom. Two $Rf^1$'s may be the same or different from each other, three $Rf^2$'s may be the same or different from each other, and three $Rf^3$'s may be the same or different from each other. $Rg^1$ to $Rg^4$ each independently designate an alkyl group, a cycloalkyl group, or an aryl group.

The number of carbon atoms of the alkyl group substituted with a fluorine atom for $Rf^1$ to $Rf^3$ is preferably 1 to 20, more preferably 1 to 12, further preferably 1 to 8, and particularly preferably 1 or 2.

The alkyl group substituted with a fluorine atom is an alkyl group substituted with at least one fluorine atom, preferably a perfluoroalkyl group.

Examples of the alkyl group substituted with a fluorine atom include perfluoromethyl, perfluoroethyl, perfluoropropyl, perfluorobutyl, perfluoropentyl, perfluorohexyl, perfluorooctyl, perfluoro 2-ethylhexyl, difluoromethyl, 2,2,2-trifluoroethyl, 1,1-difluoroethyl, 1,1,2-trifluoroethyl, 1,1,2,2-tetrafluoroethyl, and perfluorobenzyl.

The number of carbon atoms of the aryl group substituted with a fluorine atom for $Rf^1$ to $Rf^3$ is preferably 6 to 20, more preferably 6 to 12, further preferably 6 to 10, and particularly preferably 6 to 8.

The aryl group substituted with a fluorine atom is an aryl group substituted with at least one fluorine atom, preferably a perfluoroaryl group.

Examples of the aryl group substituted with a fluorine atom include perfluorophenyl, perfluorotolyl, and 2,6-dichloro-3,4,5-trifluorophenyl.

The alkyl group, the cycloalkyl group and the aryl group for $Rg^1$ to $Rg^4$ each have the same meanings as the alkyl group, the cycloalkyl group and the aryl group for Ra.

$Rg^1$ to $Rg^4$ are preferably an alkyl group or an aryl group, more preferably an alkyl group having 1 to 8 carbon atoms or an aryl group having 6 to 16 carbon atoms. The aryl group is preferably a phenyl group or a naphthyl group.

Herein, examples of the above-described organic boron anion include the following anions.

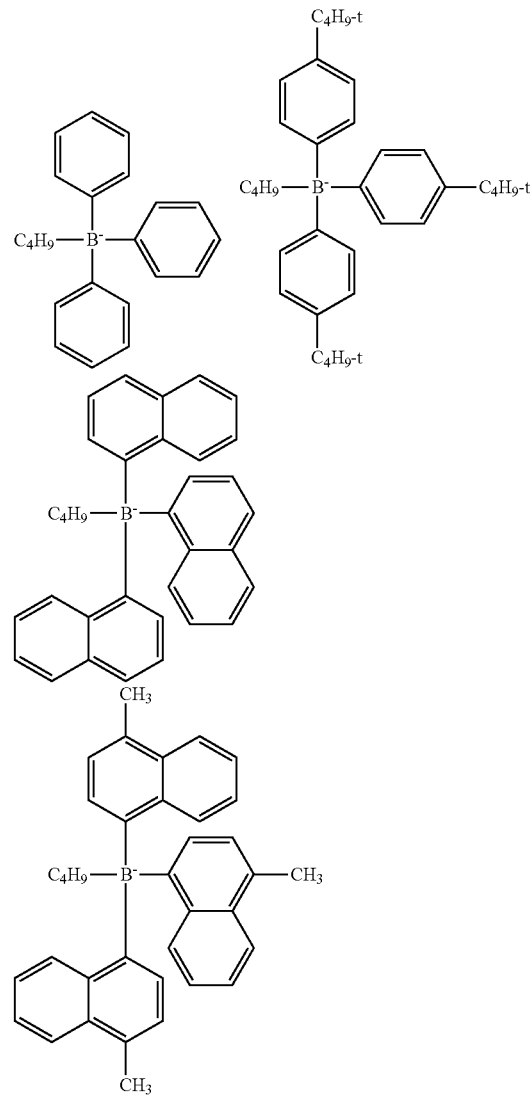

$X^-$ is preferably a halogen ion, a carboxylic acid anion, a sulfonic acid anion, a phosphate anion, a phosphonic acid anion, a dicyanamide ion, or an anion represented by Formula (A4); more preferably a halogen ion, a carboxylic acid anion, a sulfonic acid anion, a phosphate anion, a phosphonic acid anion, a dicyanamide ion, or a bis(trifluoromethanesulfonyl)imide ion; particularly preferably a halogen ion, or a carboxylic acid anion; and most preferably a carboxylic acid anion.

Examples of the ionic compound include a quaternary phosphonium salt other than the compound represented by Formula (1) or (2), and the quaternary phosphonium salt is also preferable in the present invention.

Examples of the quaternary phosphonium of the quaternary phosphonium salt include tetramethyl phosphonium, tetraethyl phosphonium, tetrabutyl phosphonium, triethylmethyl phosphonium, methyltributyl phosphonium, and dimethyldiethyl phosphonium. As the anion, the above-described $X^-$ is preferable.

The compound represented by Formula (1) or (2) is preferably a compound represented by any of Formulas (1a), (1b) and (2a) to (2c).

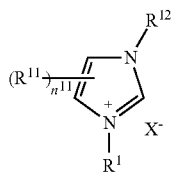
Formula (1a)

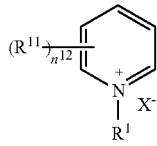
Formula (1b)

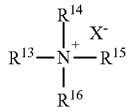
Formula (2a)

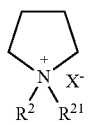
Formula (2b)

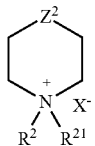
Formula (2c)

In Formulas (1a), (1b) and (2a) to (2c), $R^1$, $R^2$ and $X^-$ have the same meanings as $R^1$, $R^2$ and $X^-$ in Formula (1) or (2), respectively; and preferable ranges are also the same. $R^{11}$ and $R^{12}$ each independently designate a substituent. $n^{11}$ is an integer of 0 to 3, and $n^{12}$ is an integer of 0 to 5. Herein, when there are two or more $R^{11}$'s, the $R^{11}$'s may be the same or different from each other. In addition, at least two of $R^{11}$'s may be bonded to each other to form a ring.

$R^{13}$ to $R^{15}$ each independently designate an alkyl group, an alkenyl group, a cycloalkyl group, an aryl group, or a heterocyclic group. However, at least two of $R^2$ and $R^{13}$ to $R^{15}$ do not bond to each other to form any ring. $R^{21}$ has the same meaning as $R^2$, and a preferable range is also the same. $Z^2$ designates a single bond, a methylene group, —C(=O)—, —O—, —S—, —S(=O)—, —SO$_2$—, —N(Rα1)-, or —N$^+$(Rα1)(Rα2)-. Rα1 designates a hydrogen atom or a substituent. Rα2 designates a substituent. Herein, Rα1 and Rα2 may be bonded to each other to form a ring.

The substituent for $R^{11}$ and $R^{12}$ each have the same meaning as Ra. $R^1$ has the same meaning as $R^1$ in Formula (1), and a preferable range is also the same. $R^2$ has the same meaning as $R^2$ in Formula (2), and a preferable range is also the same.

$R^{13}$ to $R^{15}$ has the same definitions as $R^3$ to $R^5$ in Formula (2), except that at least two of $R^{13}$ to $R^{15}$ do not bond to each other to form any ring, and a preferable range of $R^{13}$ to $R^{15}$ is also the same as $R^3$ to $R^5$.

Examples of the substituent for Rα1 include the substituents for Ra. Rα1 is preferably an alkyl group, an alkenyl group, a cycloalkyl group, an aryl group, a heterocyclic group, an acyl group, or a sulfonyl group; more preferably an alkyl group, an alkenyl group, a cycloalkyl group, an aryl group, or a heterocyclic group; and further preferably an alkyl group, an alkenyl group, a cycloalkyl group, or an aryl group.

The substituent for Rα2 has the same meaning as the substituent for Rα1, and a preferable range is also the same.

The ring formed by binding at least two $R^{11}$'s to each other is preferably a 5- or 6-membered ring; more preferably a benzene ring, or a heterocycle; further preferably a benzene ring, or a heteroaromatic ring; and particularly preferably a benzene ring.

The ring formed by binding Rα1 and Rα2 to each other is preferably a 5- or 6-membered ring; more preferably a nitrogen-containing saturated ring; and further preferably a pyrrolidine ring, a piperidine ring, a piperazine ring, a morpholine ring, or a thiomorpholine ring.

$R^{11}$ and $R^{12}$ each are preferably an alkyl group. $R^{13}$ to $R^{15}$, $R^2$ and $R^{21}$ each are preferably an alkyl group or an aryl group, more preferably an alkyl group.

Further, $R^1$ and $R^{12}$ are preferably an alkyl group having different carbon atoms from each other.

In the present invention, among the compounds represented by any of Formulas (1a), (1b) and (2a) to (2c), the compound represented by Formula (1a), (1b) or (2a) is preferable, the compound represented by Formula (1a) or (2a) is more preferable, and the compound represented by Formula (1a) is further preferable.

Examples of the ionic compound used in the present invention include the following ionic liquid:
1-butyl-3-methylimidazolium acetate, 1-butyl-3-methylimidazolium chloride, 1-butyl-3-methylimidazolium bromide, 1-butyl-3-methylimidazolium dicyandiamide, 1-ethyl-3-methylimidazolium bis(trifluoromethylsulfonyl)imide, 1-butyl-3-methylimidazolium bis(trifluoromethylsulfonyl)imide, 1-hexyl-3-methylimidazolium bis(trifluoromethylsulfonyl)imide, 1-octyl-3-methylimidazolium bis(trifluoromethylsulfonyl)imide, 1-propyl-2,3-dimethylimidazolium bis(trifluoromethylsulfonyl)imide, 1-butyl-2,3-dimethylimidazolium bis(trifluoromethylsulfonyl)imide, N,N-diethyl-N-methyl-N-(2-methoxyethyl)ammonium bis(trifluoromethylsulfonyl)imide, 1-ethyl-3-methylimidazolium tris(trifluoromethylsulfonyl)methide, 1-butyl-3-methylimidazolium tris(trifluoromethylsulfonyl)methide, 1-hexyl-3-methylimidazolium tris(trifluoromethylsulfonyl)methide, 1-octyl-3-methylimidazolium tris(trifluoromethylsulfonyl)methide, 1-propyl-2,3-dimethylimidazolium tris(trifluoromethylsulfonyl)methide, 1-butyl-2,3-dimethylimidazolium tris(trifluoromethylsulfonyl)methide, N,N-diethyl-N-methyl-N-(2-methoxyethyl)ammonium tris(trifluoromethylsulfonyl)methide,
1-ethyl-3-methylimidazolium tris(pentafluoroethyl)trifluorophosphate, 1-butyl-3-methylimidazolium tris(pentafluoroethyl)trifluorophosphate, 1-hexyl-3-methylimidazolium tris(pentafluoroethyl)trifluorophosphate, 1-octyl-3-methylimidazolium tris(pentafluoroethyl)trifluorophosphate, 1-propyl-2,3-dimethylimidazolium tris(pentafluoroethyl)trifluorophosphate, 1-butyl-2,3-dimethylimidazolium tris(pentafluoroethyl)trifluorophosphate, N,N-diethyl-N-methyl-N-(2-methoxyethyl)ammonium tris(pentafluoroethyl)trifluorophosphate, 1-ethyl-3-methylimidazolium hexafluorophosphate, 1-butyl-3-methylimidazolium hexafluorophosphate, 1-hexyl-3-methylimidazolium hexafluorophosphate, 1-octyl-3-methylimidazolium hexafluorophosphate, 1-propyl-2,3-dimethylimidazolium hexafluorophosphate, 1-butyl-2,3- dimethylimidazolium hexafluorophosphate, N,N-diethyl-N-methyl-N-(2-methoxyethyl)ammonium hexafluorophosphate, 1-ethyl-3-methylimidazolium butyl triphenylborate, 1-butyl-3-methylimidazolium butyl tris(4-t-butylphenyl) borate, 1-hexyl-3-methylimidazolium butyl tris(1-naphthyl)borate, 1-octyl-3-methylimidazolium butyl tris(4-methylnaphthalene-1-yl) borate, 1-propyl-2,3-dimethylimidazolium butyl triphenylborate, 1-butyl-2,3-dimethylimidazolium hexyl tris(4-t-butylphenyl)borate, N,N-diethyl-N-methyl-N-(2-methoxyethyl)ammonium 2-ethylhexyl triphenylborate, 1-butylpyridinium hexafluorophosphate, 1-hexylpyridinium hexafluorophosphate, 1-ethyl-3-methylimidazolium tris(pentafluoroethyl)trifluorophosphate, 1-cyanomethyl-3-methylimidazolium bis(trifluoromethylsulfonyl)imide, N-hexyl-4-dimethylaminopyridinium bis(trifluoromethylsulfonyl)imide, 1-(2-hydroxyethyl)-3-methylimidazolium bis(trifluoromethylsulfonyl)imide, N-(3-hydroxypropyl)pyridinium bis(trifluoromethylsulfonyl)imide, N-ethyl-N,N-dimethyl-2-methoxyethylammonium tris(pentafluoroethyl)trifluorophosphate, 1-(2-hydroxyethyl)-3-methylimidazolium tris(pentafluoroethyl)trifluorophosphate, N-(3-hydroxypropyl)pyridinium tris(pentafluoroethyl)trifluorophosphate, N-(methoxyethyl)-N-methylmorpholium tris(pentafluoroethyl) trifluorophosphate, 1-(2-methoxyethyl)-1-methylpyrrolidinium tris(pentafluoroethyl) trifluorophosphate, 1-(methoxyethyl)-1-methylpiperidinium tris(pentafluoroethyl) trifluorophosphate, 1-(methoxyethyl)-1-methylpiperidinium bis(trifluoromethylsulfonyl)imide, N-(methoxyethyl)-1-methylpyrrolidinium bis(trifluoromethylsulfonyl)imide, and N-(methoxyethyl)-N-methylmorpholium bis(trifluoromethylsulfonyl)imide.

Meanwhile, as for the ionic compound including an ionic liquid, a commercial product can be also used.

Examples of such a compound include the following ionic liquid.

1) Water-Non-Miscible Ionic Liquid

Examples thereof include 1-ethyl-3-methylimidazolium bis(trifluoromethylsulfonyl)imide, 1-propyl-2,3-dimethylimidazolium bis(trifluoromethylsulfonyl)imide, 1-butyl-3-methylimidazolium bis(trifluoromethylsulfonyl)imide, and 1-propyl-2,3-dimethylimidazolium tris(trifluoromethylsulfonyl)methide [commercially available from Covalent Associates Inc]; and N,N-diethyl-N-methyl-N-(2-methoxyethyl)ammonium bis(trifluoromethylsulfonyl)imide, 1-hexyl-3-methylimidazolium bis(trifluoromethylsulfonyl)imide, 1-octyl-3-methylimidazolium bis(trifluoromethylsulfonyl)imide, 1-ethyl-2,3-dimethylimidazolium bis(trifluoromethylsulfonyl)imide, and 1-butyl-2,3-dimethylimidazolium bis(trifluoromethylsulfonyl)imide [commercially available from KANTO CHEMICAL CO., INC.].

2) Water-Miscible Ionic Liquid

Examples thereof include N,N-diethyl-N-methyl-N-(2-methoxyethyl)ammonium tetrafluoroborate, and 1-ethyl-3-methylimidazolium acetate [commercially available from Kanto Chemical Co., Inc.]; 1-methyl-3-propylimidazolium iodide [commercially available from Tokyo Chemical Industry Co., Ltd.], and 1-ethyl-3-methylimidazolium trifluoroacetate [commercially available from Merck Ltd, Japan].

The ionic compound may be used on one type or in combination of two or more types.

In the present invention, the content of the ionic compound is 0.001 times or more and less than 1.000 time, more preferably 0.01 times or more and less than 1.000 time, more preferably from 0.01 times to 0.8 times, still more preferably from 0.01 times to 0.8 times, and particularly preferably from 0.05 times to 0.7 times, in mass ratio with respect to the cellulose.

The ionic compound is a salt composed of an anion constituent and a cation constituent. In a case where the ionic substance is in the state of a liquid, there is also an ionic compound which has such a solution character as to completely dissolve the cellulose due to a high miscibility to a cellulose molecule.

There is a proposed explanation about the interaction between the ionic compound and the cellulose molecule as reported, for example, by Green Chem., 2015, 17, 694-714 that dissolution of the cellulose molecule into the ionic compound is caused by the mechanism that the ionic compound acts on a hydroxyl group (hydroxy group) which the cellulose molecule has, thereby to cut a hydrogen bond formed between hydroxyl groups of the cellulose molecule, which permits the ionic compound to get through cellulose molecules.

Therefore, in a case where the content of the ionic compound is 1.000 time or more with respect to the cellulose, a crystal in the cellulose dissolves and resultantly reduction in elastic modulus is caused.

In reverse, in a case where the content of the ionic compound is less than 0.001 times with respect to the cellulose, the reduction in elastic modulus is not caused, because almost all of firm hydrogen bonds between the cellulose molecules remain. However, miniaturization of the cellulose cannot be achieved only by a shear stress in a processing machine.

In view of the above, it is important to make a balance between miniaturization of the cellulose in the processing machine and improvement in a mechanical property which is obtained by a firm hydrogen bond having been formed between the cellulose molecules in the miniaturized cellulose.

<Other Addition Component>

Into the thermoplastic resin composition of the present invention, in addition to the above-described materials, other addition components can be appropriately incorporated in the range in which the above-described purpose is not adversely affected, such as an antioxidant, a light stabilizer, a radical scavenger, an ultraviolet absorber, a colorant (dye, organic pigment, inorganic pigment), a filler, a slipping agent, a plasticizer, a processing aid such as an acrylic processing aid, a foaming agent, a lubricant such as paraffin wax, a surface treatment agent, a nucleating agent, a releasing agent, a hydrolysis inhibitor, an anti-blocking agent, an antistatic agent, an anticlouding agent, a fungicidal agent, an ion trapping agent, a flame retardant and a flame retardant aid.

Specific examples of the antioxidant and a deterioration inhibitor include a phenol-based antioxidant, a phosphorus-based antioxidant, a sulfur-based antioxidant, a hydroxylamine-based antioxidant and an amine-based antioxidant. As the phenol-based antioxidant, a hindered phenol-based compound having a t-alkyl group in an ortho position is preferable.

Specific examples of the phenol-based antioxidant include tetrakis[methylene-3-(3',5'-di-t-butyl-4-hydroxyphenyl)propionate]methane, octadecyl-3-(3,5-di-t-butyl-4-hydroxyphenyl)propionate, 3,9-bis[2-{3-(3-t-butyl-4-hydroxy-5-methylphenyl)propionyloxy}-1,1-dimethylethyl]-2,4,8,10-tetraoxaspiro[5.5]undecane, triethyleneglycol-N-bis-3-(3-t-butyl-5-methyl-4-hydroxyphenyl)propionate, 1,6- hexandiol bis[3-(3,5-di-t-butyl-4-hydroxyphenyl) propionate]; and 2,2-thiobis-diethylene bis[3-(3,5-di-t-butyl-4-hydroxyphenyl)propionate], and further preferably include 3,9-bis[2-{3-(3-t-butyl-4-hydroxy-5-methylphenyl) propionyloxy}-1,1-dimethylethyl]-2,4,8,10-tetraoxaspiro [5.5]undecane, lauryl-3,5-t-butyl-4-hydroxy benzoate, palmityl-3,5-t-butyl-4-hydroxybenzoate, stearyl-3,5-t-butyl-4-hydroxy benzoate, behenyl-3,5-t-butyl-4-hydroxy benzoate, 2,4-di-t-butyl-phenyl-3,5-di-t-butyl-4-hydroxy benzoate and tocopherols.

Specific examples of the phosphorous-based antioxidant include tris(nonylphenyl)phosphite, tris(2,4-di-t-butylphenyl)phosphite, distearylpentaerythritol diphosphite, bis(2,4-di-t-butylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, bis(2,4-dicumylphenyl)pentaerythritol diphosphite, tetrakis(2,4-di-t-butylphenyl)-4,4'-diphenylene diphosphonite, 2,2'-methylene bis(4,6-di-t-butylphenyl)-2-ethylhexyl phosphite, 2,2'-ethylidene bis(4,6-di-t-butylphenyl)fluoro phosphite, bis(2,4-di-t-butyl-6-methylphenyl)ethyl phosphite, 2-(2,4,6-tri-t-butylphenyl)-5-ethyl-5-butyl-1,3,2-oxaphosphorinane, 2,2',2'-nitrilo[triethyl-tris(3,3',5,5'-tetra-t-butyl-1,1'-biphenyl-2,2'-diyl)phosphite, and 2,4,8,10-tetra-t-butyl-6-[3-(3-methyl-4-hydroxy-5-t-butylphenyl)propoxy] dibenzo[d,f][1,3,2]dioxaphosphepine.

Specific examples of the sulfur-based antioxidant include dilauryl 3,3'-thiodipropionate, tridecyl 3,3'-thiodipropionate, dimyristyl 3,3'-thiodipropionate, distearyl 3,3'-thiodipropionate, laurylstearyl 3,3'-thiodipropionate, neopentanetetrayl tetrakis(3-laurylthiopropionate) and bis[2-methyl-4-(3-n-alkyl) (an alkyl having 12 to 14 carbon atoms) thiopropionyloxy)-5-t-butylphenyl] sulfide.

Specific examples of the light stabilizer include a hindered amine light stabilizer having a molecular weight of 1000 or more (a light stabilizer having a 2,2,6,6-tetramethylpiperidine skeleton in the molecule).

Specific examples of the ultraviolet absorber include a benzotriazol-based compound, a triazine-based compound, a benzophenone-based compound, a salicylate-based compound, a cyanoacrylate-based compound and a nickel-based compound.

Specific examples of the colorant include carbon black, an inorganic pigment and an organic pigment. Specific examples of the carbon black include furnace black, channel black, acetylene black and lamp black. Specific examples of the inorganic pigment include black iron oxide, red iron oxide, titanium oxide, cadmium red, cadmium yellow, ultramarine blue, cobalt blue, titan yellow, red lead, yellow lead and iron blue. Specific examples of the organic pigment include quinacridone, polyazo yellow, anthraquinone yellow, polyazo red, azolake yellow, perylene, phthalocyanine green, phthalocyanine blue and isoindolinone yellow. These colorants may be used singly or two or more kinds thereof may be used in combination.

As the filler, silica, hydroxyapatite, alumina, titania, boehmite, talc, a metal compound such as calcium carbonate, and the like are preferably exemplified.

<<Method of Producing Thermoplastic Resin Composition>>

In the present invention, in the thermoplastic synthetic resin together with the cellulose and the ionic compound, miniaturization of the cellulose can be carried out.

In the production of the thermoplastic resin composition, the thermoplastic synthetic resin, the cellulose and the ionic compound may be blended so that the content of the cellulose is from 1 to 100 parts by mass with respect to 100 parts by mass of the thermoplastic synthetic resin, and the content of the ionic compound is set to 0.001 times or more and less than 1.000 time of the content of the cellulose.

In the present invention, a method of adding the ionic compound for the miniaturization of the cellulose is not particularly limited. Examples thereof include a method of preliminarily impregnating the ionic liquid into the cellulose, or a method of adding the ionic compound upon kneading the thermoplastic synthetic resin and the cellulose.

It is preferred to prepare a mixture of the cellulose and the ionic compound, namely a cellulose composition, and to blend the cellulose composition and the thermoplastic synthetic resin.

Therefore, a step of preparing the cellulose composition in which the content of the ionic compound is 0.1% by mass or more and less than 50% by mass is performed.

In the present invention, a blended amount of the cellulose composition or a total blended amount of the cellulose and the ionic compound is adjusted so that the content of the cellulose is from 1 to 100 parts by mass with respect to 100 parts by mass of the thermoplastic synthetic resin.

Herein, the ionic compound, for example, in a case of the halogen anion (chlorine anion in particular), sometimes translates into a liquid form due to moisture absorption depending on the condition of storage. In this case, it is preferred to use a material in a solid-form at room temperature, from which water has been evaporated by drying in a vacuum.

In the cellulose, an intermolecular association force is firm by a hydrogen bond due to hydroxyl groups in the molecule.

It is considered that the ionic compound cuts a hydrogen bond between cellulose molecules. Furthermore, it is considered that an anion constituent in the constituent elements of the ionic compound directly acts on a hydrogen atom of the hydroxyl group which the cellulose molecule has. Therefore, it is presumed that a structure of the anion constituent has a profound effect on ability to dissolve the cellulose.

In the cellulose itself, as described above, since the intermolecular association force is firm, miniaturization cannot be moved forward only with a shear stress in a processing machine. Therefore, the ionic compound allows miniaturization to be moved forward by partially weakening the intermolecular association force.

In the present invention, a thermoplastic synthetic resin, and the cellulose composition or the cellulose and the ionic compound are each blended, and a step of a kneading processing is carried out and the cellulose is miniaturized in this process.

In this step of the kneading processing, the kneading is preferably performed in the processing machine at the step of processing and molding by extrusion, injection, or the like.

The kneading temperature is at least a melting point or more of the ionic compound, and is preferably up to a temperature at which a heat decomposition of the cellulose is a little. Accordingly, although a temperature of the lower limit changes depending on the kind of the ionic compound, a temperature of the upper limit is preferably 300° C. or less, more preferably 250° C. or less, and further preferably 230° C. or less.

As to the agitation in the kneading, the kneading is preferably performed by assembling a screw constitution capable of ensuring an enough kneading property, for example, by appropriately arranging kneading discs in the screw shaft direction, and by a screw rotation speed (ordinarily, nearly the range of 100 to 300 rpm) which enables to obtain a required amount of production.

As to the apparatus for the kneading processing, an apparatus of two-shaft screw system rotating in the same direction is preferable. Examples thereof include a twin screw extruder [KZW15TW-45MG-NH manufactured by Technovel Corporation].

However, the apparatus for the kneading processing is not limited to the apparatus of two-shaft screw system rotating in the same direction, but apparatus of any system may be accepted, as long as an enough kneading property is obtained, whereby the effects of the present invention are obtained equally, such as a single-shaft extruder, an anisotropic two-shaft extruder, a three-shaft or more multi-shaft extruder, a batch-type kneader (kneader, Bunbury mixer, or the like) and the like.

<<Molded Article of Cellulose-Reinforced Resin and Method of Producing the Same>>

The cellulose-reinforced resin or the molded article of the cellulose-reinforced resin of the present invention contains a thermoplastic synthetic resin, a cellulose, and an ionic compound, in which the content of the cellulose is from 1 to 100 parts by mass, with respect to 100 parts by mass of the thermoplastic synthetic resin, and the content of the ionic compound is 0.001 times or more and less than 1.000 time of the cellulose.

The cellulose-reinforced resin or the molded article of the cellulose-reinforced resin of the present invention is molded by employing the thermoplastic resin composition of the present invention, particularly the thermoplastic resin composition produced by the method of producing the above-described thermoplastic resin composition according to the present invention.

Specific examples of an application of the molded article to be formed by the thermoplastic resin composition or the cellulose-reinforced resin of the present invention include a material for a vehicle such as an automobile and a two-wheeled vehicle, a structural member of a robot arm, a robot part for amusement, a prosthesis member, a material for electrical appliances, an OA device housing, a building material member, drainage facilities, a toiletry material, various tanks, a container, a sheet, a toy and sport goods.

Specific examples of the material for the vehicle include an interior part such as a door trim, a pillar, an instrumental panel, a console, a rocker panel, an armrest, an inner panel of door, a spare tire cover and a door knob, an exterior part such as a bumper, a spoiler, a fender, a side step and an outer panel of door, other parts such as an air intake duct, a coolant reserve tank, a radiator reserve tank, a window-washer tank, a fender liner and a fan, and an integrally molded part such as a front-end panel.

EXAMPLES

Hereinafter, the present invention will be described more in detail with reference to Examples, but the present invention is not limited thereto.

Hereinafter, the used materials are shown.

<Used Materials>

(1) Thermoplastic Synthetic Resin

Thermoplastic synthetic resin A: High density polyethylene [MFR=5 g/10 minutes (190° C./2.16 kg), density=0.953 g/cm$^3$]

Thermoplastic synthetic resin B: Ethylene-propylene copolymer [ethylene content 16 mass %, MFR (190° C./2.16 kg)=1.4 g/10 minutes, density=0.862 g/cm$^3$]

Thermoplastic synthetic resin C: Ethylene-octene copolymer [MFR=1.0 g/10 minutes (190° C./2.16 kg), density=0.870 g/cm$^3$]

(2) Cellulose

Cellulose A: KC FLOC W-200 [trade name, manufactured by Nippon Paper Industries Co., Ltd., powdered cellulose having average particle diameter of about 32 μm]

Cellulose B: LIGNOCEL C-120 [trade name, manufactured by J•Rettenmaier & Sons, particle diameter of 70 to 150 μm]

(3) Ionic Compound

Ionic compound A: 1-butyl-3-methylimidazolium acetate (melting point: −20° C. or less)

Ionic compound B: 1-butyl-3-methylimidazolium chloride (melting point: up to 70° C.)

Ionic compound C: 1-butyl-3-methylimidazolium dicyandiamide (melting point: −6° C.)

Example 1

The cellulose-reinforced thermoplastic resin was produced by the following steps.

1) Preparing Step of Cellulose Composition

In an acetone solvent, 90 parts by mass of Cellulose A was dispersed and was mixed with 10 parts by mass of Ionic compound A, and then the mixture was left to stand in a covered container for 12 hours or more while stirring the mixture at a few hour intervals.

After that, the lid of the container was opened to evaporate the acetone solvent. After evaporation of most of the acetone solvent, the container was further stored for 12 hours or more in a thermostat at 80° C. in order to dehydrate.

2) Kneading Step of Cellulose Composition and Thermoplastic Synthetic Resin (production of Cellulose-Reinforced Thermoplastic Resin Composition)

A cellulose-reinforced thermoplastic resin composition was produced by feeding Thermoplastic synthetic resin B in a twin screw extruder [KZW15TW-45MG-NH, manufactured by Technovel Corporation] at outlet temperature of 150° C. and a speed of 300 g/hr., and at the same time, by feeding the above-prepared cellulose composition using a second feeder at a speed of 300 g/hr., thereby to extrude them. At this time, the screw rotation speed was set to 100 rpm.

At this extrusion step, Thermoplastic synthetic resin B and Cellulose A were kneaded to disperse the cellulose, whereby the cellulose fiber was miniaturized. Further, it is considered that this miniaturization further moved ahead also at the following 3) Preparation step. Meanwhile, even if miniaturization was not enough at the forgoing 2) Kneading step, miniaturization can be achieved by performing the following 3) Preparation step.

3) Preparation Step of Cellulose-Reinforced Thermoplastic Resin Composition Containing Thermoplastic Synthetic Resin A The cellulose-reinforced thermoplastic resin composition in which the cellulose fiber miniaturized by the above-described extrusion had been dispersed in Thermoplastic synthetic resin B, and Thermoplastic synthetic resin A were subjected to a dry-blending so that Thermoplastic synthetic resin A: Thermoplastic synthetic resin B was 78:22 in terms of ratio by mass. Then, a cellulose-reinforced thermoplastic resin composition containing two kinds of the thermoplastic synthetic resins was prepared by a twin screw extruder [KZW15TW-45MG-NH, manufactured by Technovel Corporation] to produce the same. At this time, the outlet temperature of the twin screw extruder was set to 190° C.

and the cellulose-reinforced thermoplastic resin composition was prepared by feeding at a speed of 1,000 g/hr. At this time, the screw rotation speed was set to 100 rpm.

It is considered that miniaturization of the cellulose fiber further moved ahead also at this preparation process.

Example 2

A cellulose-reinforced thermoplastic resin composition containing one kind of the thermoplastic synthetic resin obtained by the step 2) was produced without the step 3) in Example 1.

Example 3

A cellulose-reinforced thermoplastic resin composition containing two kinds of the thermoplastic synthetic resins was prepared and produced in the same manner as in Example 2, except for blending 0.1 parts by mass of Ionic compound A with respect to 99.9 parts by mass of Cellulose A in the step 1) of Example 1, and employing, in place of Thermoplastic synthetic resin B, a resin in which Thermoplastic synthetic resin A and Thermoplastic synthetic resin B were mixed so as to be 499:1 in terms of ratio by mass.

Example 4

A cellulose-reinforced thermoplastic resin composition containing one kind of the thermoplastic synthetic resin was produced in the same manner as in Example 2, except for blending 49.9 parts by mass of Ionic compound A with respect to 50.1 parts by mass of Cellulose A in the step 1) of Example 1.

Example 5

A cellulose-reinforced thermoplastic resin composition containing two kinds of the thermoplastic synthetic resins was produced in the same manner as in Example 1, except for subjecting Thermoplastic synthetic resin A to a dry bending so that Thermoplastic synthetic resin A: Thermoplastic synthetic resin B was 98:2 in the step 3) in Example 1.

Example 6

A cellulose-reinforced thermoplastic resin composition containing two kinds of the thermoplastic synthetic resins was produced in the same manner as in Example 1, except for changing the kind of the ionic compound in the step 1) of Example 1 to Ionic compound B.

Example 7

A cellulose-reinforced thermoplastic resin composition containing two kinds of the thermoplastic synthetic resins was produced in the same manner as in Example 1, except for changing the kind of the ionic compound in the step 1) of Example 1 to Ionic compound C.

Example 8

A cellulose-reinforced thermoplastic resin composition containing one kind of the thermoplastic synthetic resin was produced in the same manner as in Example 1, except for blending 11 parts by mass of the cellulose composition with respect to 100 parts by mass of the Thermoplastic synthetic resin A in the step 2) without the step 3) in Example 1.

Example 9

A cellulose-reinforced thermoplastic resin composition containing one kind of the thermoplastic synthetic resin was produced in the same manner as in Example 8, except for changing the kind of the cellulose in the step 1) of Example 1 to Cellulose B.

Example 10

A cellulose-reinforced thermoplastic resin composition containing two kinds of the thermoplastic synthetic resins was prepared in the same manner as in Example 1, except for employing Thermoplastic synthetic resin C in place of Thermoplastic synthetic resin B so that Thermoplastic synthetic resin C: the cellulose composition was 90:100 in terms of ratio by mass in the step 2) of Example 1, and subjecting the cellulose-reinforced thermoplastic resin composition dispersed in the Thermoplastic synthetic resin C, and Thermoplastic synthetic resin A to a dry-blending so that Thermoplastic synthetic resin A: the cellulose-reinforced thermoplastic resin composition dispersed in Thermoplastic synthetic resin C is 260:190 in terms of ratio by mass in the step 3) of Example 1.

Example 11

A cellulose-reinforced thermoplastic resin composition containing two kinds of the thermoplastic synthetic resins was prepared in the same manner as in Example 10, except for blending 30 parts by mass of Ionic compound A with respect to 70 parts by mass of Cellulose A in the step 1) of Example 1, changing the blended ratio so that Thermoplastic synthetic resin C:the cellulose composition was 70:100 in terms of ratio by mass in the step 2) of Example 1, and subjecting the cellulose-reinforced thermoplastic resin composition dispersed in Thermoplastic synthetic resin C, and Thermoplastic synthetic resin A to a dry-blending so that Thermoplastic synthetic resin A: the cellulose-reinforced thermoplastic resin composition dispersed in Thermoplastic synthetic resin C was 180:170 in terms of ratio by mass in the step 3) of Example 1.

Example 12

A cellulose-reinforced thermoplastic resin composition containing two kinds of the thermoplastic synthetic resins was prepared in the same manner as in Example 10, except for blending 49.9 parts by mass of Ionic compound A with respect to 50.1 parts by mass of Cellulose A in the step 1) of Example 1, changing the blended ratio so that Thermoplastic synthetic resin C:the cellulose composition is 50:100 in terms of ratio by mass in the step 2) of Example 1, and subjecting the cellulose-reinforced thermoplastic resin composition dispersed in Thermoplastic synthetic resin C, and Thermoplastic synthetic resin A to a dry-blending so that Thermoplastic synthetic resin A: the cellulose-reinforced thermoplastic resin composition dispersed in Thermoplastic synthetic resin C was 100:150 in terms of ratio by mass in the step 3) of Example 1.

Comparative Example 1

In the step 1) of Example 1, 70 parts by mass of Ionic compound A was blended with respect to 30 parts by mass of Cellulose A. In the present case, this step affected the handling property in a manner such that the powdered cellulose dissolved and the dissolved powdered cellulose partially recrystallized in the acetone solvent, and the cellulose-dissolved material converted to a thickened liquid form after drying clung to materials. Therefore, in the step 2), a twin-screw extruder was not employed, but LABO PLASTOMILL (kneading-extrusion molding evaluation test apparatus, LABO PLASTOMILL μ, manufactured by Toyo Seiki Seisaku-sho Co., Ltd.) was used. The obtained composition was pelletized, whereby a thermoplastic resin composition was prepared and produced.

Further, in the step 3), a cellulose-reinforced thermoplastic resin composition containing two kinds of the thermoplastic synthetic resins was prepared in the same manner as in the step 3) of Example 1, except for subjecting Thermoplastic synthetic resin A to a dry-blending so that Thermoplastic synthetic resin A: Thermoplastic synthetic resin B was 50:50 in terms of ratio by mass.

Comparative Example 2

A cellulose-reinforced thermoplastic resin composition containing one kind of the thermoplastic synthetic resin was prepared and produced in the same manner as in Example 2, except for employing Thermoplastic synthetic resin A in place of Thermoplastic synthetic resin B, and blending 112 parts by mass of the cellulose composition in a proportion based on 100 parts by mass of Thermoplastic synthetic resin A in the step 2) Example 1.

Comparative Example 3

A cellulose-reinforced thermoplastic resin composition containing one kind of the thermoplastic synthetic resin was prepared and produced without the step 1) of Example 1, and by employing Cellulose A itself in place of the cellulose composition, and blending 11.1 parts by mass of Cellulose A with respect to 100 parts by mass of Thermoplastic synthetic resin A in the step 2) of Example 1, and by extruding the resultant mixture using a twin screw extruder (KZW15TW-45MG-NH, manufactured by Technovel Corporation).

The short side length of the cellulose fiber existing in each of the cellulose-reinforced thermoplastic resin composition prepared and produced as described above and the aggregate area were measured as described below.
(Measurement of Short Side Length of Cellulose Fiber)

Each cellulose-reinforced thermoplastic resin composition was soaked in liquid nitrogen and was wrecked by applying an external force thereto in the state of brittle temperature or lower, thereby exposing the broken-out section.

A backscattered electron image to this broken-out section was observed by an electron microscope to measure a short side length of the cellulose fiber.

Among randomly counted 200 cellulose fibers, the number ratio in terms of abundance of cellulose fibers having a length of 2 μm or less was also measured.

The case where this ratio is 15% or more indicates that the cellulose fibers have been miniaturized, and this means that the elastic modulus is improved by miniaturization and reinforcement efficiency of the thermoplastic resin is high.
(Area measurement of Cellulose Aggregate)

Each cellulose-reinforced thermoplastic resin composition was subjected to a press molding under the conditions of 5 minute preheat at 160° C. and 5 minute pressurization at a pressure of 20 MPa, whereby an about 0.1 mm thick sheet was prepared. The sheet thus-prepared above was photographed at 50 magnification using an industrial micrometer "ECLIPSE LV100ND", manufactured by Nikon Corporation. In the photographed image, a portion counted at the brightness of 0 to 80 was designated as cellulose aggregate.

The area of vision was 1.3 mm×1.7 mm, and designating this vision as n1, 9 points in a random manner were observed. The area of the cellulose aggregate was calculated by performing image analysis of the portion obtained by counting at the brightness of 0 to 80, using "NIS-Elemenets D" manufactured by Nikon Corporation.

The case where every calculated area of the cellulose aggregate at 9 points is less than 20,000 $\mu m^2$ is the targeted acceptable level. The case where any one of the calculated areas of the cellulose aggregate is 20,000 $\mu m^2$ or more is the rejected level.

In Tables 1 and 2, the maximum area and the minimum area of the calculated areas of the cellulose aggregate at 9 points were indicated respectively as "Maximum value" and "Minimum value".

To be less than 20,000 $\mu m^2$ in every calculated area of the cellulose aggregate indicates that the cellulose fiber is miniaturized in uncondensed state when it is miniaturized, and means that improvement in the elastic modulus in addition to the short side length of the cellulose fiber is further advanced, whereby reinforcement efficiency of the thermoplastic resin is high.
(Appearance of the Injection Molded Article)

Injection molding was performed using each cellulose-reinforced thermoplastic resin composition to prepare a bending test specimen (4 mm in thickness×80 mm in length). Meanwhile, the injection molding was performed under the molding conditions that are considered to be proper in general. The prepared injection molded article was visually observed to evaluate uniformity of the cellulose dispersion by the presence or absence of the cellulose fiber aggregate.
(Measurement of Apparent Elastic Modulus of Cellulose in Thermoplastic Resin Composition)

In each produced cellulose-reinforced thermoplastic resin composition, the apparent elastic modulus of cellulose contained in the each cellulose-reinforced thermoplastic resin composition was measured as follows.

Injection molding was performed using each of the produced cellulose-reinforced thermoplastic resin compositions to prepare a bending test specimen (4 mm in thickness×80 mm in length). Meanwhile, the injection molding was performed under the molding conditions that are considered to be proper in general. The bending elastic modulus was calculated according to JIS K 7171. The density was compliant with JIS K 7112. However, as a measurement solvent, ethanol was used instead of water. From the obtained density, the volume fraction of each constituent of the synthetic resin and cellulose was calculated. Meanwhile, the density and the elastic modulus of just the synthetic resin were calculated separately according to JIS K 7112 and JIS K 7171. The apparent elastic modulus of cellulose $E_f$ was calculated from Equation (2.2) modified from Equation (2.1).

Meanwhile, $E_m$ was calculated from Equation (4.1) based on the Law of mixture on the condition of Equation (4.2).

Of the obtained results, the results in Example 8 and Comparative Example 3 are shown in Table 3 as a representative thereof.

$$Ec = EmVm + EfVf \quad (2.1)$$

$$Ef = \{Ec - Em(1 - Vf)\}/Vf \quad (2.2)$$

$$Em = \sum_{p=1}^{n} EpVp \quad (4.1)$$

$$\sum_{p=1}^{n} Vp = 1 \quad (4.2)$$

Herein, Ec is a Young's modulus (elastic modulus) of the bending test specimen of the composite material. Em is a Young's modulus (elastic modulus) of the thermoplastic synthetic resin of the base material. Ef is a Young's modulus (elastic modulus) of the cellulose of the fiber.

Vm is a volumetric ratio of the thermoplastic synthetic resin of the base material. Vf is a volumetric ratio of the cellulose of the fiber. These volumetric ratios are calculated from their densities.

Ep is a Young's modulus (elastic modulus) of the constituent p, and Vp is a volumetric ratio of the constituent p. These are calculated from their densities. Meanwhile, the constituent exists in number of from 1 to n, and n is the maximum number of the existing constituent.

The obtained results are shown collectively in Tables 1 to 3.

Herein, the amounts of the thermoplastic synthetic resin and the cellulose composition are indicated by the mass part, and the expression "-" indicates not in use, namely 0 (zero) part by mass. Further, in the breakdown for the cellulose and the ionic compound, these values indicate a mass part ratio of these materials. The expression "-" indicates not in use, namely 0 (zero) part by mass in the same manner as described above.

On the other hand, the expression "-" in the measurement results indicates the unmeasurable level which results in not evaluated.

Meanwhile, A and B in the cellulose composition indicates that the employed cellulose is either A or B.

TABLE 1

| Composition | | Ex 1 | Ex 2 | Ex 3 | Ex 4 | Ex 5 |
|---|---|---|---|---|---|---|
| Thermoplastic synthetic resin | A | 78 | — | 99.8 | — | 98 |
| | B | 22 | 100 | 0.2 | 100 | 2 |
| | C | — | — | — | — | — |
| Cellulose composition | A | 11 | 100 | 100 | 100 | 1.2 |
| | B | — | — | — | — | — |
| Breakdown Cellulose | | 90 | 90 | 99.9 | 50.1 | 90 |
| Ionic compound | A | 10 | 10 | 0.1 | 49.9 | 10 |
| | B | — | — | — | — | — |
| | C | — | — | — | — | — |
| Ratio in terms of abundance of cellulose having 2 μm or less (%) | | 22.9 | 22 | 17.9 | 37.8 | 23.7 |
| Area of cellulose aggregates (μm$^2$) | Maximum value | 16993 | 18897 | 19121 | 5798 | 15911 |
| | Minimum value | 504 | 501 | 503 | 503 | 517 |
| Appearance of injection molded article (presence or absence of fiber aggregate) | | Absence | Absence | Absence | Absence | Absence |

| Composition | | Ex 6 | Ex 7 | Ex 8 | Ex 9 |
|---|---|---|---|---|---|
| Thermoplastic synthetic resin | A | 78 | 78 | 100 | 100 |
| | B | 22 | 22 | — | — |
| | C | — | — | — | — |
| Cellulose composition | A | 11 | 11 | 11 | — |
| | B | — | — | — | 11 |
| Breakdown Cellulose | | 90 | 90 | 90 | 90 |
| Ionic compound | A | — | — | 10 | 10 |
| | B | 10 | — | — | — |
| | C | — | 10 | — | — |
| Ratio in terms of abundance of cellulose having 2 μm or less (%) | | 18.8 | 20.9 | 16.8 | 16.1 |
| Area of cellulose aggregates (μm$^2$) | Maximum value | 17111 | 16143 | 16555 | 17530 |
| | Minimum value | 505 | 504 | 502 | 503 |
| Appearance of injection molded article (presence or absence of fiber aggregate) | | Absence | Absence | Absence | Absence |

Remarks:
'Ex' means Example according to this invention.

TABLE 2

| Composition | | Ex 10 | Ex 11 | Ex 12 | CEx 1 | CEx 2 | CEx 3 |
|---|---|---|---|---|---|---|---|
| Thermoplastic synthetic resin | A | 74.3 | 72 | 66.7 | 50 | 100 | 100 |
| | B | — | — | — | 50 | — | — |
| | C | 25.7 | 28 | 33.3 | — | — | — |
| Cellulose composition | A | 28.6 | 40 | 66.7 | 25 | 112 | 11 |
| | B | — | — | — | — | — | — |
| Breakdown | Cellulose | 90 | 70 | 50.1 | 30 | 90 | 100 |
| | Ionic compound A | 10 | 30 | 49.9 | 70 | 10 | — |
| | B | — | — | — | — | — | — |
| | C | — | — | — | — | — | — |
| Ratio in terms of abundance of cellulose having 2 μm or less (%) | | 25.6 | 35.4 | 48.3 | — | 14.4 | 4.6 |
| Area of cellulose aggregates (μm²) | Maximum value | 15578 | 14480 | 7231 | — | 25411 | 144374 |
| | Minimum value | 505 | 502 | 507 | — | 501 | 504 |
| Appearance of injection molded article (presence or absence of fiber aggregate) | | Absence | Absence | Absence | — | Presence | Presence |

Remarks:
'Ex' means Example according to this invention, and 'CEx' means Comparative Example.

TABLE 3

| Composition | | Ex 8 | CEx 3 |
|---|---|---|---|
| Thermoplastic synthetic resin | A | 100 | 100 |
| | B | — | — |
| Cellulose composition A | | 11 | 11 |
| Breakdown | Cellulose | 90 | 100 |
| | Ionic compound A | 10 | — |
| | B | — | — |
| | C | — | — |
| Ratio in terms of abundance of cellulose having 2 μm or less (%) | | 16.8 | 4.6 |
| Elastic modulus of cellulose (GPa) Ef | | 4.73 | 4.12 |

Remarks:
'Ex' means Example according to this invention, and 'CEx' means Comparative Example.

From the above-described Tables 1 and 2, in each of the thermoplastic resin compositions of Examples 1 to 12 according to the present invention, the abundance ratio of the cellulose fiber having a short side length of 2 μm or less was 15% or more, and the area of the cellulose aggregates was less than 20,000 μm².

In contrast, in the thermoplastic resin composition of Comparative Example 1, the blended amount of the ionic compound to be blended into the cellulose was in excessive quantities, whereby the cellulose fiber was dissolved. As a result, this made unable to observe the form as a dispersing element. On the other hand, in the thermoplastic resin composition of Comparative Example 2, the blended amount of the cellulose was not in excessive quantities. As a result, although a partial progression of the miniaturization was confirmed, in parallel, the cellulose aggregate whose area was 20,000 μm² or more existed and the abundance ratio of the cellulose fiber having a short side length of 2 μm or less got below 15%. In the thermoplastic resin composition of Comparative Example 3, the abundance ratio of the cellulose fiber having a short side length of 2 μm or less was less than 15%, and the area of the cellulose aggregates was 20,000 μm² or more.

As can be seen from Example 8 shown as a representative in the above Table 3, in the composition in which 15% or more of the cellulose was miniaturized to 2 μm or less, reinforcement effect of the resin can been more remarkably seen. It is considered that this phenomenon is caused by improvement in elastic modulus of the cellulose due to the miniaturized cellulose.

It is found that the thermoplastic resin compositions of Examples 1 to 12 according to the present invention are useful for a variety of molded articles formed of a cellulose-reinforced resin, because the elastic modulus is improved, whereby reinforcement efficiency of the thermoplastic resin is increased.

Having described our invention as related to this embodiment, it is our intention that the invention not be limited by any of the details of the description, unless otherwise specified, but rather be construed broadly within its spirit and scope as set out in the accompanying claims.

The invention claimed is:

1. A thermoplastic resin composition, comprising:
a thermoplastic synthetic resin,
a cellulose, and
an ionic compound;
wherein a content of the cellulose is from 9.9 to 100 parts by mass, with respect to 100 parts by mass of the thermoplastic synthetic resin,
wherein a content of the ionic compound is 0.001 times or more and 0.43 times or less of the content of the cellulose,
wherein the cellulose is plant fiber-derived cellulose, and
wherein the ionic compound is represented by Formula (1):

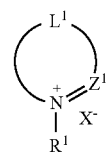

Formula (1)

wherein, in Formula (1), $Z^1$ designates =C(Ra)— or =N—; Ra designates a hydrogen atom or a substituent; $L^1$ designates a divalent linking group; $R^1$ designates an alkyl group, an alkenyl group, a cycloalkyl group, an aryl group or a heterocyclic group; and $X^-$ designates an anion.

2. The thermoplastic resin composition according to claim 1, wherein the compound represented by Formula (1) is represented by any one of Formulas (1a) and (1b):

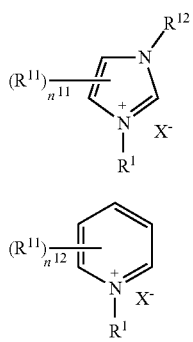

Formula (1a)

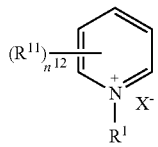

Formula (1b)

wherein, in Formulas (1a) and (1b), $R^1$ and $X^-$ have the same meanings as $R^1$ and $X^-$ in Formula (1), respectively; $R^{11}$ and $R^{12}$ each independently designates a substituent; $n^{11}$ is an integer of 0 to 3; $n^{12}$ is an integer of 0 to 5; when there exists two or more $R^{11}$'s, the $R^{11}$'s may be the same or different from each other; and at least two of the $R^{11}$'s may be bonded to each other to form a ring.

3. The thermoplastic resin composition according to claim 1, wherein the $X^-$ is a halogen ion, a carboxylic acid anion, a sulfonic acid anion, a phosphate anion, a phosphonic acid anion, a dicyanamide ion, or a bis(trifluoromethanesulfonyl) imide ion.

4. The thermoplastic resin composition according to claim 1,
wherein the cellulose is a rod-like fiber, and
wherein 15% or more of the fiber has a short side length of 2 μm or less.

5. The thermoplastic resin composition according to claim 1, wherein a cellulose aggregate contained in the thermoplastic resin composition has an area of less than 20,000 μm².

6. A method of producing the thermoplastic resin composition according to claim 1, which comprises blending a thermoplastic synthetic resin and a mixture of a cellulose and an ionic compound,
wherein a content of the ionic compound in the mixture is 0.1% by mass or more and less than 30% by mass.

7. The method according to claim 6, wherein the cellulose in the mixture is powdered pulp.

8. The method of producing the thermoplastic resin composition according to claim 6, which contains a step of subjecting the thermoplastic resin composition to a kneading processing.

9. A method of producing a molded article of a cellulose-reinforced resin, which comprises employing the thermoplastic resin composition produced by the method of producing the thermoplastic resin composition according to claim 6, thereby molding the thermoplastic resin composition.

10. A molded article of a thermoplastic resin composition, comprising:
a thermoplastic synthetic resin,
a cellulose, and
an ionic compound;
wherein a content of the cellulose is from 9.9 to 100 parts by mass, with respect to 100 parts by mass of the thermoplastic synthetic resin,
wherein a content of the ionic compound is 0.001 times or more and 0.43 times or less of the content of the cellulose,
wherein the cellulose is plant fiber-derived cellulose and
wherein the ionic compound is represented by Formula (1):

Formula (1)

wherein, in Formula (1), $Z^1$ designates =C(Ra)— or =N—; Ra designates a hydrogen atom or a substituent; $L^1$ designates a divalent linking group; $R^1$ designates an alkyl group, an alkenyl group, a cycloalkyl group, an aryl group or a heterocyclic group; and $X^-$ designates an anion.

11. A molded article of a cellulose-reinforced resin, which is obtained by molding the thermoplastic resin composition according to claim 1.

12. The molded article of a cellulose-reinforced resin according to claim 10, wherein an application of the molded article is a material for a vehicle.

13. The molded article of a cellulose-reinforced resin according to claim 10, wherein the molded article is a door trim, a pillar, an instrumental panel, a console, a rocker panel, an armrest, an inner panel of door, a spare tire cover, a door knob, a bumper, a spoiler, a fender, a side step, an outer panel of door, an air intake duct, a coolant reserve tank, a radiator reserve tank, a window-washer tank, a fender liner, a fan, or a front-end panel.

14. The molded article of a cellulose-reinforced resin according to claim 11, wherein an application of the molded article is a material for a vehicle.

15. The molded article of a cellulose-reinforced resin according to claim 11, wherein the molded article is a door trim, a pillar, an instrumental panel, a console, a rocker panel, an armrest, an inner panel of door, a spare tire cover, a door knob, a bumper, a spoiler, a fender, a side step, an outer panel of door, an air intake duct, a coolant reserve tank, a radiator reserve tank, a window-washer tank, a fender liner, a fan, or a front-end panel.

16. The thermoplastic resin composition, wherein
the content of the cellulose is from 34.0 to 100 parts by mass, with respect to 100 parts by mass of the thermoplastic synthetic resin.

* * * * *